United States Patent [19]
Bjorn et al.

[11] Patent Number: 6,125,192
[45] Date of Patent: Sep. 26, 2000

[54] FINGERPRINT RECOGNITION SYSTEM

[75] Inventors: Vance C. Bjorn, San Carlos; Serge J. Belongie, Berkeley, both of Calif.

[73] Assignee: Digital Persona, Inc., Redwood City, Calif.

[21] Appl. No.: 08/837,549

[22] Filed: Apr. 21, 1997

[51] Int. Cl.[7] .................................................. G06K 9/00
[52] U.S. Cl. ...................... 382/124; 340/825.34; 382/100
[58] Field of Search ................................. 382/124–127, 382/318, 319, 130, 288, 115, 116, 100; 356/71; 340/825.34; 380/23–25

[56] References Cited

U.S. PATENT DOCUMENTS

| | | | |
|---|---|---|---|
| 3,419,287 | 12/1968 | Rudie | 283/7 |
| 3,872,438 | 3/1975 | Cuttill et al. | 340/149 A |
| 3,959,884 | 6/1976 | Jordan et al. | 340/146.3 |
| 4,047,154 | 9/1977 | Vitols et al. | 340/146.3 |
| 4,151,512 | 4/1979 | Riganati et al. | 340/146.3 |
| 4,156,230 | 5/1979 | Riganati et al. | 340/146.3 |
| 4,185,270 | 1/1980 | Fischer, II et al. | 340/146.3 |
| 4,208,651 | 6/1980 | McMahon | 340/146.3 |
| 4,210,899 | 7/1980 | Swonger et al. | 340/146.3 |
| 4,225,850 | 9/1980 | Chang et al. | 340/146.3 |
| 4,253,086 | 2/1981 | Szwarcbier | 340/146.3 |
| 4,260,979 | 4/1981 | Smith | 340/146.3 |
| 4,414,684 | 11/1983 | Blonder | 382/4 |
| 4,449,189 | 5/1984 | Feix et al. | 364/513.5 |
| 4,454,610 | 6/1984 | Sziklai | 382/3 |
| 4,525,859 | 7/1985 | Bowles et al. | 382/5 |
| 4,581,760 | 4/1986 | Schiller et al. | 382/4 |
| 4,607,384 | 8/1986 | Brooks | 382/4 |
| 4,618,988 | 10/1986 | Schiller | 382/5 |
| 4,636,622 | 1/1987 | Clark | 235/380 |
| 4,641,350 | 2/1987 | Bunn | 382/4 |
| 4,646,352 | 2/1987 | Asai et al. | 382/5 |
| 4,685,145 | 8/1987 | Schiller | 382/52 |
| 4,696,046 | 9/1987 | Schiller | 382/5 |
| 4,698,751 | 10/1987 | Parvin | 364/200 |
| 4,723,298 | 2/1988 | Schiller | 382/56 |
| 4,747,147 | 5/1988 | Sparrow | 382/4 |
| 4,752,966 | 6/1988 | Schiller | 382/5 |

(List continued on next page.)

FOREIGN PATENT DOCUMENTS

| | | | |
|---|---|---|---|
| 0159037 | 10/1985 | European Pat. Off. | G07C 9/00 |
| 4125198 | 5/1992 | Germany | G06K 19/073 |
| 5089324 | 8/1993 | Japan | G07D 9/00 |
| 1283748 | 8/1972 | United Kingdom | G07D 9/00 |
| 8203286 | 9/1982 | WIPO | G07C 11/00 |
| 9107728 | 5/1991 | WIPO | G06K 9/00 |

*Primary Examiner*—Bhavesh Mehta
*Attorney, Agent, or Firm*—Blakely, Sokoloff, Taylor & Zafman LLP

[57] ABSTRACT

A method and apparatus for fingerprint recognition is provided. A fingerprint is detected on a sensor. The fingerprint is digitized. A digitized background is subtracted from the fingerprint, resulting in a difference print. The difference print is matched with a database of fingerprint templates.

33 Claims, 18 Drawing Sheets

U.S. PATENT DOCUMENTS

| | | | |
|---|---|---|---|
| 4,777,651 | 10/1988 | McCann et al. | 382/21 |
| 4,787,742 | 11/1988 | Schiller et al. | 356/71 |
| 4,790,564 | 12/1988 | Larcher et al. | 283/69 |
| 4,805,223 | 2/1989 | Denyer | 382/4 |
| 4,811,414 | 3/1989 | Fishbine et al. | 382/52 |
| 4,817,183 | 3/1989 | Sparrow | 382/4 |
| 4,827,527 | 5/1989 | Morita et al. | 382/288 |
| 4,837,843 | 6/1989 | Owechko | 382/31 |
| 4,876,726 | 10/1989 | Capello et al. | 382/4 |
| 4,891,503 | 1/1990 | Jewell | 235/380 |
| 4,896,363 | 1/1990 | Taylor et al. | 382/5 |
| 4,907,156 | 3/1990 | Doi et al. | 382/130 |
| 4,933,976 | 6/1990 | Fishbine et al. | 382/4 |
| 4,944,021 | 7/1990 | Hoshino et al. | 382/5 |
| 4,947,442 | 8/1990 | Tanaka et al. | 382/5 |
| 4,947,443 | 8/1990 | Costello | 382/5 |
| 4,956,870 | 9/1990 | Hara | 382/30 |
| 4,993,068 | 2/1991 | Piosenka et al. | 380/23 |
| 4,995,086 | 2/1991 | Lilley et al. | 382/4 |
| 5,040,223 | 8/1991 | Kamiya et al. | 382/4 |
| 5,040,224 | 8/1991 | Hara | 382/4 |
| 5,050,220 | 9/1991 | Marsh et al. | 382/4 |
| 5,050,222 | 9/1991 | Lee | 382/21 |
| 5,053,608 | 10/1991 | Senanayake | 235/380 |
| 5,054,090 | 10/1991 | Knight et al. | 382/4 |
| 5,067,162 | 11/1991 | Driscoll, Jr. et al. | 382/5 |
| 5,095,194 | 3/1992 | Barbanell | 235/379 |
| 5,101,436 | 3/1992 | DeAguiar et al. | 382/1 |
| 5,105,467 | 4/1992 | Kim et al. | 382/4 |
| 5,109,428 | 4/1992 | Igaki et al. | 382/5 |
| 5,144,680 | 9/1992 | Kobayashi et al. | 382/4 |
| 5,151,945 | 9/1992 | Lee et al. | 382/103 |
| 5,175,593 | 12/1992 | Kumagai et al. | 356/71 |
| 5,187,747 | 2/1993 | Capello et al. | 382/4 |
| 5,187,748 | 2/1993 | Lee | 382/4 |
| 5,222,152 | 6/1993 | Fishbine et al. | 382/2 |
| 5,222,153 | 6/1993 | Beiswenger | 382/4 |
| 5,239,590 | 8/1993 | Yamamoto | 382/4 |
| 5,402,324 | 3/1995 | Yokoyama et al. | 362/19 |
| 5,416,573 | 5/1995 | Sartor, Jr. | 356/71 |
| 5,448,649 | 9/1995 | Chen et al. | 382/382 |
| 5,448,659 | 9/1995 | Tsutsui et al. | 385/14 |
| 5,467,403 | 11/1995 | Fishbine et al. | 382/116 |
| 5,493,621 | 2/1996 | Matsumura | 382/125 |
| 5,509,083 | 4/1996 | Abtahi et al. | 382/124 |
| 5,513,272 | 4/1996 | Bogosian, Jr. | 382/116 |
| 5,522,623 | 6/1996 | Soules et al. | 283/91 |
| 5,524,069 | 6/1996 | Inoue | 382/270 |
| 5,524,161 | 6/1996 | Omori et al. | 382/125 |
| 5,530,757 | 6/1996 | Krawczyk | 380/23 |
| 5,541,994 | 7/1996 | Tomko et al. | 380/30 |
| 5,563,345 | 10/1996 | Kersten et al. | 73/602 |
| 5,572,597 | 11/1996 | Chang et al. | 382/125 |
| 5,613,012 | 3/1997 | Hoffman et al. | 382/115 |
| 5,619,586 | 4/1997 | Sibbald | 382/127 |
| 5,623,552 | 4/1997 | Lane | 382/124 |
| 5,625,448 | 4/1997 | Ranalli et al. | 356/71 |
| 5,644,645 | 7/1997 | Osuga | 382/124 |
| 5,668,603 | 9/1997 | Copeland | 348/473 |
| 5,680,205 | 10/1997 | Borza | 356/71 |

PICTURE A    PICTURE B    PICTURE C

PICTURE I

PICTURE H

PICTURE G

PICTURE F

PICTURE E

PICTURE D

FINGERPRINT RECOGNITION SYSTEM

FIELD OF THE INVENTION

The present invention relates to biometrics, and more specifically, to electronic verification and identification of individuals using biometrics.

BACKGROUND OF THE INVENTION

Securing computer systems and electronic transactions is becoming more and more important as we enter the electronic age. Existing password and cryptographic techniques seem well on their way to solving the security problems of computer systems, electronic commerce, and electronic transactions. These solutions ensure that the set of digital identification keys associated with an individual person can safely carry on electronic transactions and information exchanges. Little, however, has been done to ensure that such identification keys can only be used by their legitimate owners. This is a critical link that needs to be made secure if secure computer access, electronic commerce, home banking, point of sale, electronic transactions, and similar mechanisms are to become truly secure.

Today, passwords handle most of these issues. For example, most electronic transactions, such as logging into computer systems, getting money out of automatic teller machines, processing debit cards, electronic banking, and similar transactions require passwords. Passwords are an imperfect solution because as more and more systems attempt to become secure, a user is required to memorize an ever expanding list of passwords. Additionally, passwords are relatively easily obtained by observing an individual when he or she is entering the password. Moreover, there is no guarantee that users will not communicate passwords to one another, lose passwords, or have them stolen. Thus, passwords are not considered sufficiently secure for many functions.

More and more often, fingerprint identification is considered. Fingerprints have the advantage of being unique to an individual person, requiring no memorization, and being relatively difficult to appropriate. Thus, some secure systems are switching to fingerprint recognition. Fingerprint recognition generally requires a user to place his or her finger on a fingerprint sensing device. Each fingerprint consists of a unique arrangement of ridges and grooves. The fingerprint sensing device transmits an analog image of the user's fingerprint, via a coaxial cable, to a computer system. The computer system then matches the fingerprint to a database of fingerprint templates in the computer system. However, there are a number of problems with prior art fingerprint identification methods.

First, the fingerprint sensing devices, the devices on which the finger is placed, are generally bulky. This means that such devices can not be adapted to be used with portable computers, consumer electronics, or in situations where space is precious.

Additionally, fingerprint devices generally require a connection to a power outlet in addition to the connection to the computer system. This means that if the fingerprint device needs to be used, an additional power outlet is consumed. Thus, such devices can not be adapted for use in situations where extra power outlets are not available.

Furthermore, because conventional fingerprint devices generally transmit an analog image of the fingerprint, via a coaxial cable, security may be breached. The analog fingerprint image may be obtained by intercepting the image transmitted on the coaxial cable. Thus, if a false user had an image capturing device, he or she may be able to impersonate an original user, by resending a captured image. This reduces security in cases where the actual fingerprint sensing procedure is not observed by anyone.

Furthermore, because fingerprint processing in conventional systems generally takes place in the computer system, the computer system itself can be corrupted to defeat the security provided by the fingerprint sensing device. In the end, the computer system decides whether the fingerprint received from the device matches a print in the database. Either the database can be altered or the process which matches the print to the database can be altered to send a false positive indication. In this way, the advantages of the fingerprint sensing system may be lost.

Moreover, in conventional systems the user is required to interact with the fingerprint sensing system. Generally, the prior art process of sensing a fingerprint is as follows. First, the user positions his or her finger on the sensing sensor platen. An image of the fingerprint is displayed on the computer monitor, with a cross-hair. The user is asked to position his or her finger such that the cross hairs are centered, and that the print is clearly displayed. When the user has determined that the finger is in the proper position, the user must press a button to indicate that this is the image to be transmitted. Once the user has selected the proper fingerprint, the device takes an image, and sends it to the computer system for processing. However, this awkward and error-prone procedure requires active participation and control by the user. It would be advantageous if such interaction were not required.

In addition, the conventional fingerprint devices are not very accurate if the user's finger is too dry or oily, or if the sensor platen on which the finger is placed is dirty. This occurs for a number of reasons. Generally conventional fingerprint devices take a picture of the finger which was placed on the sensor platen. Places where there is something contacting the sensor platen, such as a ridge on a finger, do not reflect the light, but rather absorb it. Places where there is nothing contacting the sensor platen, such as grooves in the fingerprint, reflect the light. This produces an image of absorbed and reflected light on the sensing sensor platen. However, dirt and smudges on the sensor platen can also absorb light thereby producing a false image. This image represents all of the dirt and smudges on the sensor platen, in addition to showing the actual fingerprint. One method of solving this, in the prior art, is to shine a stronger light on the finger as the image is captured. The stronger light is strong enough to break through smudges on the sensor platen, and thus light is reflected even if there is some residue on the sensor platen. However, using such a stronger light causes other problems. The brighter light also requires more power. The brighter light is also less likely to pick up on fingerprints which are not perfectly clear. If, for example, the user's finger is dry, the ridges are not well defined, and the brighter light may not pick them up.

Thus, a more accurate fingerprint sensing method is needed, which is not adversely impacted by a dirty sensor platen, and which does not allow the security breaches of the prior art.

BRIEF SUMMARY OF THE INVENTION

The method and apparatus for fingerprint recognition is provided. A fingerprint is detected on a sensor. The fingerprint is digitized. A digitized background is subtracted from the fingerprint, resulting in a difference print. The difference print is matched with a database of fingerprint templates.

The background is obtained by taking an image of the sensor platen at the time of startup, and after each fingerprint is detected. Thus, the current state of the background, including smudges, lighting unevenness, and other factors are detected and subtracted from the digitized fingerprint.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for electronic verification and identification of individuals using biometrics is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Overview

Figure 1:
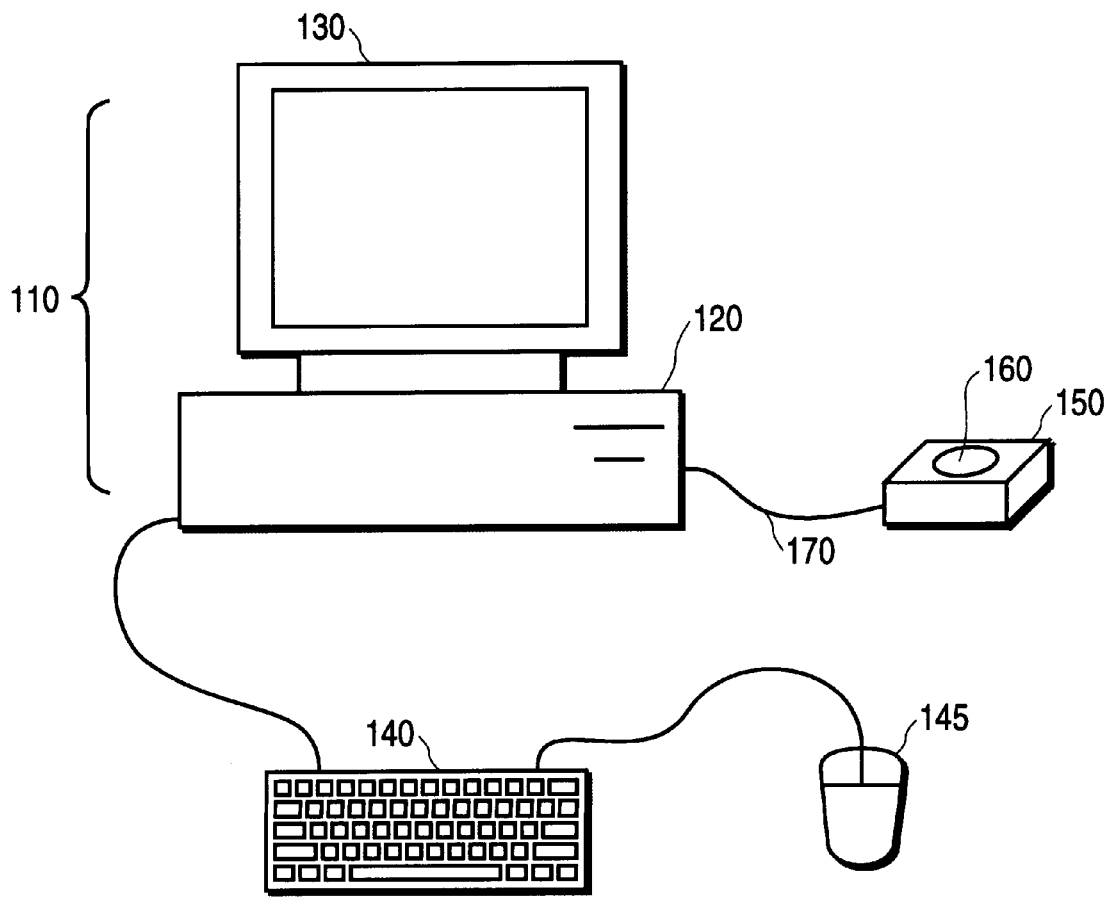
FIG. 1 illustrates an overview level diagram of a sample system in which one embodiment of the present invention may be implemented.

FIG. 1 illustrates an overview level diagram of a sample system in which one embodiment of the present invention may be implemented. A digital system 110 is a computing system which has the processing ability to compare a received digitized image with a database of digitized templates, and control a digital connection for receiving the digitized image. In the preferred embodiment, the digital connection is a data bus which conforms to a universal serial bus (USB) standard, as is well known to those of ordinary skill in the art. In this figure digital system 110 is represented as a computer system. The computer system 110 includes a body 120, which contains the processing power of the computer system 110. Computer system 110 also includes a display 130. The display 130 may be a liquid crystal display (LCD), cathode ray tube (CRT), or similar display mechanism. Computer system 110 includes a data entry mechanism 140. In this instance, a keyboard 140 is illustrated. The keyboard 140 permits a user to interact with the computer system 110. A conventional cursor control device 145 is further illustrated. The cursor control device 145 may be a mouse, trackball, pen, or similar device.

In one embodiment, sensor 150 is coupled to the computer system 110 via a cable 170. Alternatively, sensor 150 may be coupled to computer system 110 via an infrared, radio frequency, modem, network, or any other direct or indirect digital connection.

The sensor 150 of the present invention includes a sensor platen 160, on which a finger is placed for the fingerprint recognition. In one embodiment, cable 170 is a universal serial bus (USB) connection. It will be apparent to those of ordinary skill in the art that other digital connections may also be used. The sensor 150 may further have a connection to a power source. However, if the cable 170 is a USB connection, no such additional power connection is required as the USB connection provides power. It is to be understood that FIG. 1 is merely an illustration of one embodiment of a system on which the present invention may be practiced. Alternate configurations, such as a portable computer 110, a digital system which does not have all of the components illustrated, or a sensor 150 having a different shape or size may also be utilized.

Figure 2:
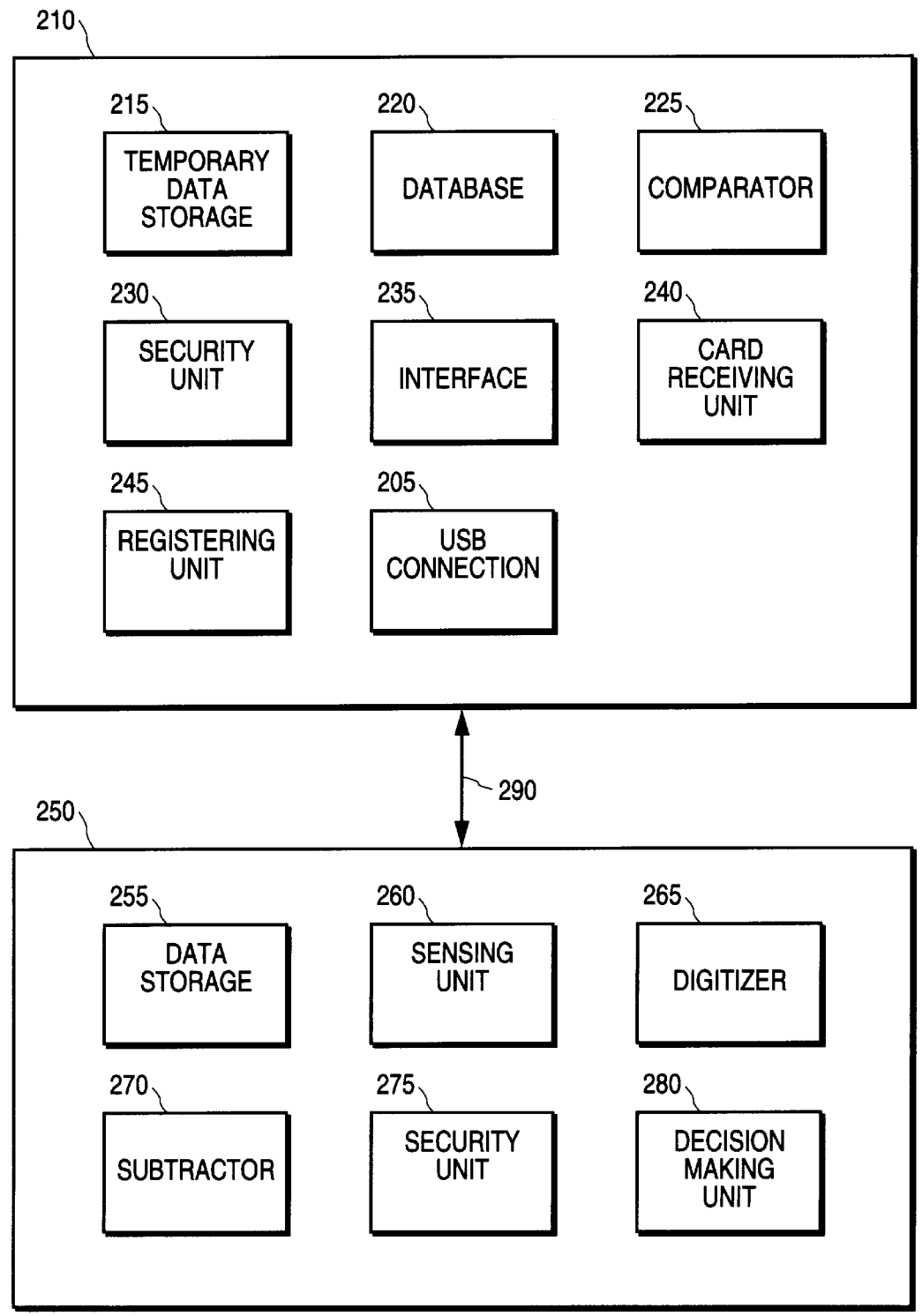
FIG. 2 is a functional block diagram of a digital processing system and a sensor.

FIG. 2 is a functional block diagram of the digital system 210 and sensor 250 of the present invention. In one embodiment, the digital system 210 may be embodied in a computer system 110. The digital system 210 includes a temporary data storage 215, for storing data temporarily. The temporary data storage 215 may include random access memory (RAM), and various registers. Digital system 210 further includes database 220. Database 220 is for storing fingerprint templates, identification data, etc. for each individual person who is registered with that system. Comparator 225 is for comparing fingerprint data. In one embodiment, the comparator 225 is able to compare data stored in the database 220 with data stored in the temporary data storage 215. The comparator 225 has an output which determines whether or not the data provided to it match or not.

Security unit 230 is utilized to encrypt and decrypt messages sent between the digital system 210 and the sensor 250 on line 290 and to determine, maintain and use session keys. Security unit 250 is further described below. An interface 235 interacts with the user and with other programs in the digital system 210 and the sensor 250. Interface 235 may display various windows in a WINDOWS or MACINTOSH environment. Windows is a trademark of Microsoft Corporation, and Macintosh is a trademark of Apple Computers, Inc.

Card receiving unit 240 may be integral with digital system 210, or it may be attached to digital system 210 via a bus, cable, infrared, or other connection method. Card receiving unit 240 is for receiving a token, smart card, barcode, diskette, or similar medium which may store personal information about the holder of the card, and may contain fingerprint information. The card receiving unit 240 may be utilized to verify the identity of the card holder with respect to fingerprint information stored on the card.

Registering unit 245 enables a user to register with the digital system 210, such that the user's fingerprint identification is placed in the database 220. The digital system 210 may further include a universal serial bus (USB) controller 205. The universal serial bus controller 205 couples the digital system 210 with the sensor 250, in one embodiment. Universal serial bus controller 205 provides a data conduit as well as power to sensor 250. The functioning of the universal serial bus controller 205 may be found in more detail in the Universal Serial Bus Specification, Revision 1.0, Jan. 15, 1996.

Sensor 250 is coupled to the digital system 210 through connection 290. In one embodiment, the connection 290 is USB, which provides both data and power connections. Alternatively, sensor 250 may have a separate power connection.

Sensor 250 includes a data storage unit 255. Data storage unit 255 may include RAM, registers, as well as memory. Data storage unit 255 stores intermediate values of prints, templates, sums, session keys, permanent sensor signature, and similar data.

Sensor 250 further includes a sensing mechanism 260. The sensing mechanism 260 may include a sensor platen, on which a user can place his or her fingers for recognition. The sensing mechanism 260 may be a conventional fingerprint sensing mechanism, consisting of a light, illuminating at least one prism, which reflects the print on the sensor platen. The reflected print is received by a detector array. Alternatively, sensing mechanism 260 may utilize other methods of sensing, including capacitive sensors.

Sensor 250 further includes a digitizer 265. Digitizer 265 digitizes images received from the sensing mechanism 260. Mechanisms which may be used to digitize an image are known in the art. In one embodiment, a conventional analog-to-digital converter is utilized.

Sensor 250 further includes a subtractor 270. Subtractor 270 is utilized to filter a digitized fingerprint image and subtract a background image from a print, as will be described below.

Security unit 275 in the sensor 250 corresponds to the security unit 230 in the digital system 210. However, it may further store the private key of the sensor, its signature, in a tamper-proof environment.

Finally, sensor 250 includes decision making unit 280. Decision making unit 280 may be utilized to make a final determination whether a fingerprint matches the print in the database 220. Decision making unit 280 may be used when digital system 210 is not secure, and strict security is necessary. The functioning of the above described components is elaborated further below.

In one embodiment, digital system 210 may be a computer system, a PCMCIA card, a portable computer, a network station and server, a palm top computer, or any other system which may be capable of processing the data required. Furthermore, the sensor 250 may be located within the digital system 210. In such a case, no duplicative memory, security units and USB controller would be required.

Figure 3:
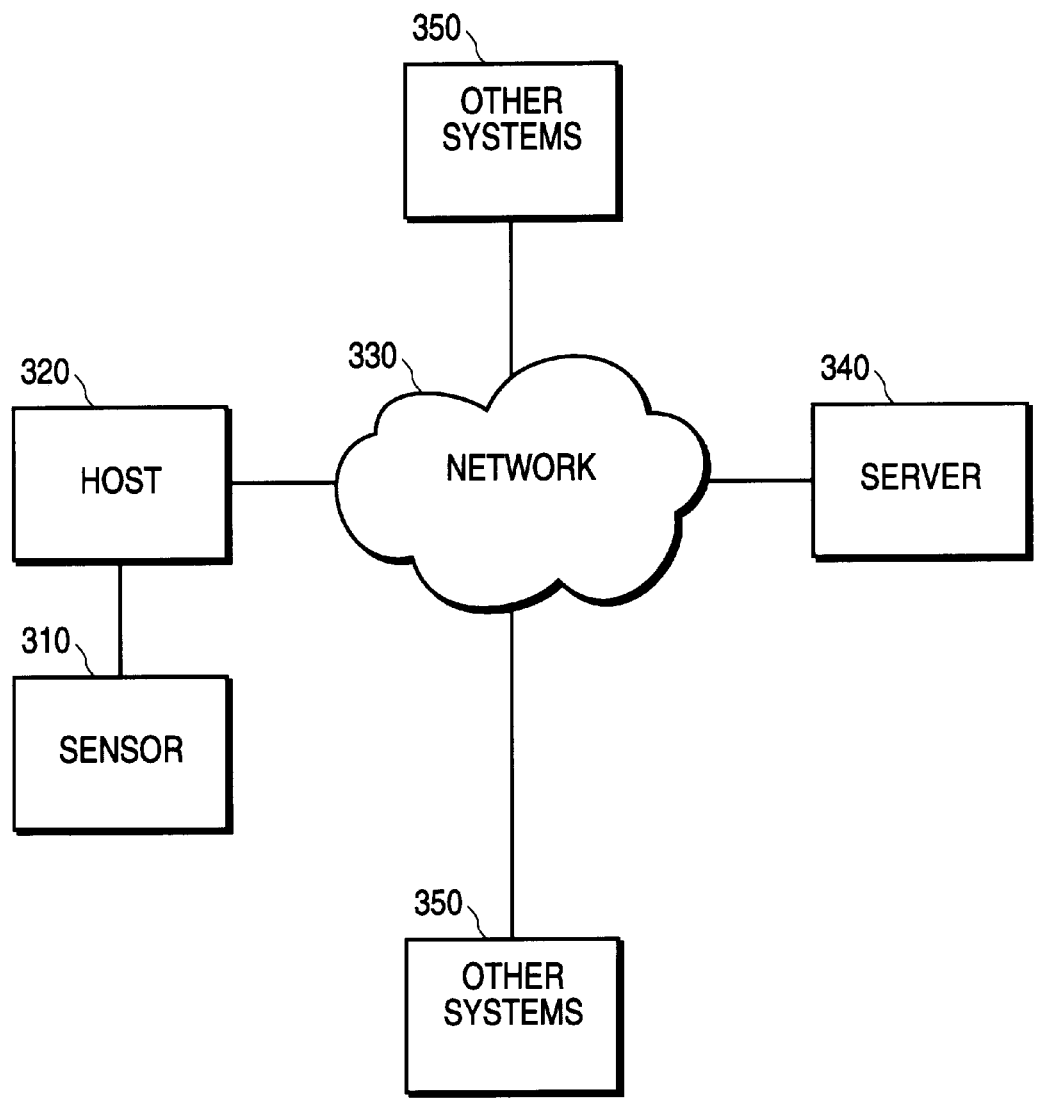
FIG. 3 is a functional block diagram of one embodiment of a networked sensor and server.

FIG. 3 illustrates a network in which the present invention may be utilized. Sensor 310 is coupled to host 320. Host 320 is enabled to connect to a network 330, which couples a plurality of systems 320, 340, 350 together. A server 340 contains the database which is matched to the fingerprint received by sensor 310. Other systems 350 may be utilized for their processing power. Thus, the actual fingerprint recognition process may be distributed over a plurality of systems 320, 340, 350. Such a distributed processing may be used for accessing remote data through a network. Because neither the server 340, nor the other systems 350 are secure, for security purposes final matching may be done in the sensor 310. This would be accomplished by sending the processed data back to the sensor 310. Thus, the sensor 310 receives matched elements, and the original fingerprint. Verifying that the matched elements truly match the original fingerprint is a process which may be accomplished in the sensor 310. Thus, the sensor 310 may send out the final matched/not matched signal, thus creating a secure system over an insecure network 330.

Figure 4:
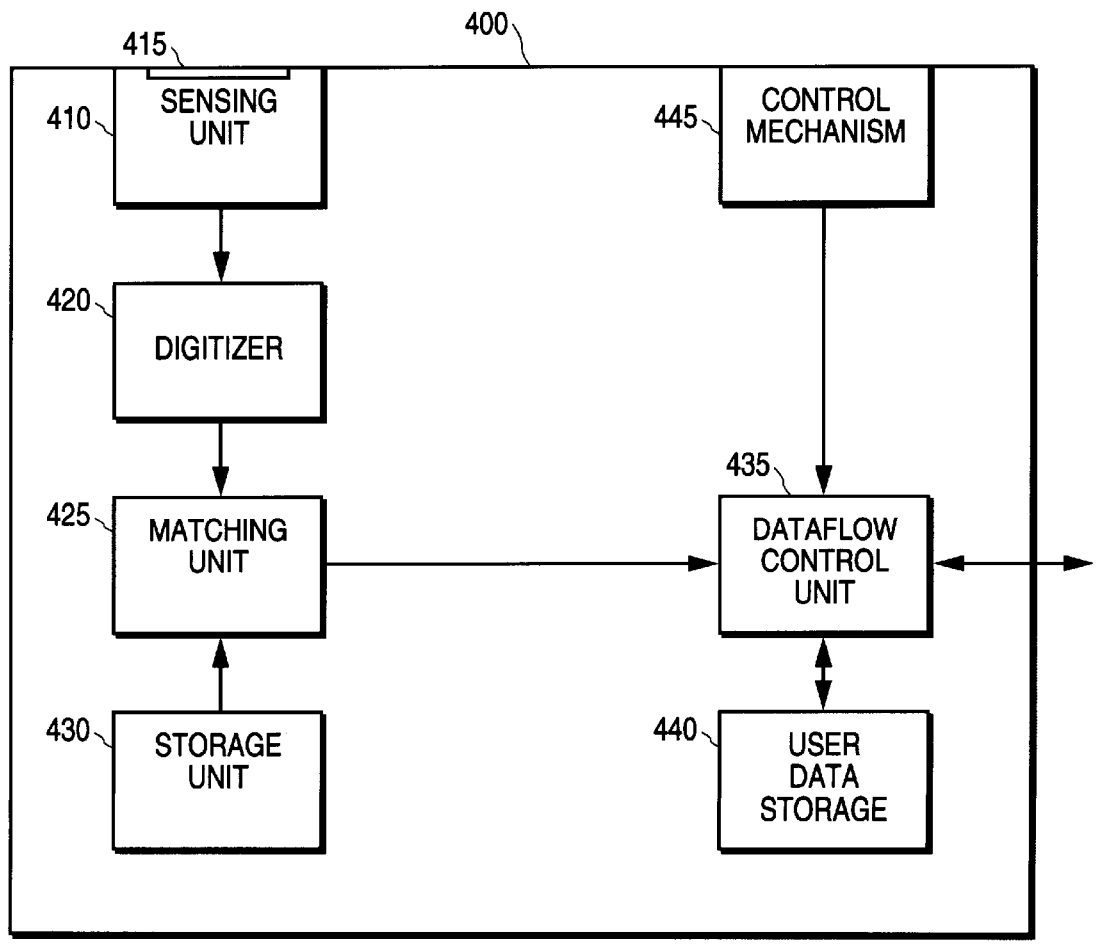
FIG. 4 is a functional block diagram of one embodiment of a wallet.

FIG. 4 illustrates a block diagram of one embodiment of a system which combines the functionality of the sensor 250 and digital system 210 into a single unit, called a wallet 400. A wallet 400 may be implemented with different configurations of software and hardware. For example, the entire wallet 400 may reside in a smart card, or it may be implemented as a distributed system that may include a smart card, database, and matching/control software distributed over a network.

Sensing unit 410 has a sensor platen 415 on which a finger is placed. Sensing unit 410 receives the image, and passes it on to digitizer 420. Digitizer 420 digitizes the fingerprint image, and passes it on to a matching unit 425. Matching unit 425 further has access to a storage unit 430, which stores a database of templates. Matching unit 425 matches the features of the received fingerprint, to the templates in the storage unit 430. In one embodiment, such a wallet 400 belongs to one individual only, whose print is stored in the storage unit 430. The matching unit 425 passes on a yes/no decision, whether prints match, to a data flow control unit 435. The data flow control unit 435 controls access to data stored in a user data unit 440. The data flow control unit 435 may further allow the user to upload information to the wallet 400 once the user's access to the wallet 400 is verified.

The user data unit 440 may contain such information as the user's credit card number, social security number, and identity. The user data unit 440 may further contain any information a user wishes to store in the user data unit 440. The wallet 400 further may include a control mechanism 445, such as a keyboard, mouse, trackball, touch pad, etc. The user may utilize the control mechanism 445 to add data to the wallet 400.

Figure 5:
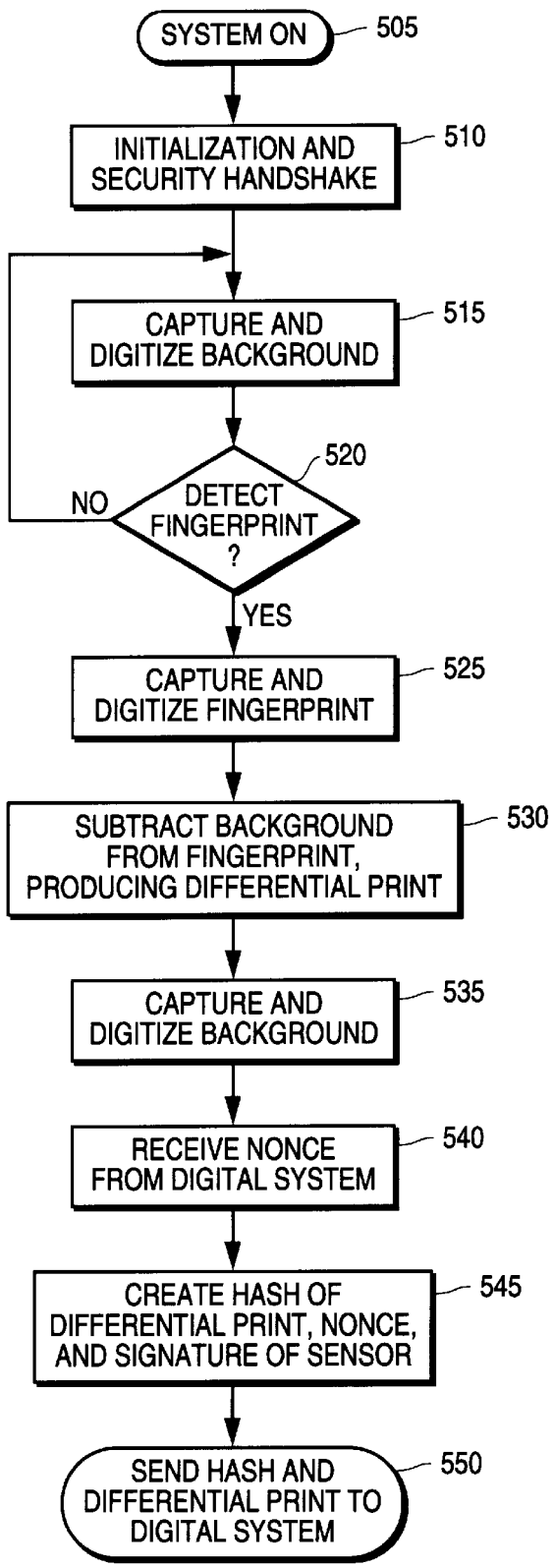
FIG. 5 is an overview flowchart illustrating the process occurring in the sensor.

FIG. 5 is a flowchart illustrating the overview of the process occurring in the sensor 250. At block 505, the sensor is turned on. This may occur when the digital system 210 is first turned on. Alternatively, because the universal serial bus 290 permits plug-and-play, this may occur when the sensor is first connected to the digital system 210.

At block 510, initialization and a security handshake occurs. Because the connection between the digital system 210 and the sensor 250 is designed to be a secure connection, a security handshake ensures that the sensor 250 has not been substituted, and that the digital system 210 has not been tampered with. A security handshake may be implemented using conventional encryption or public/private key methods.

At block 515, a background image is captured and digitized. When the sensor 250 is initialized, the optical light source in the sensing unit 260 is turned on, and an image is captured. At this time, there is no fingerprint on the sensor platen, thus this image is a background image. The digitized background is temporarily stored in data storage 255. Alternatively, the background image may be sent to the digital system 210, and stored in the data storage unit 215. The background image may be further used to estimate the background noise and image, and estimate the overall background. In one embodiment, each background image captured is further processed to create an average background, which may be utilized by the sensor. This learning process will be described in more detail below.

At block 520, the system tests whether a fingerprint is detected on the sensor platen. In one embodiment, the fingerprint detection is a measurement of the energy level of the light received from the sensor platen. If the energy level drops below a certain level the fingerprint is detected. Alternatively, a fingerprint may be detected as a result of a pressure sensor, a heat sensor, or a similar device.

If no fingerprint is detected on the sensor platen, the process returns to block 515, and a new background image is captured and digitized. In one embodiment, if no fingerprint is detected, a new background image is captured approximately every 2 seconds. Alternatively, the original background may be maintained. If a fingerprint is detected, the process continues to block 525.

At block 525, the fingerprint image is captured and digitized. As described above, the sensing unit 250 receives an image of the fingerprint placed on the sensor platen which is captured by a detector array. The captured fingerprint is digitized, and stored. The digitized print may be stored in the sensor 250 or in the digital system 210.

At block 530, the digitized background image is subtracted from the digitized fingerprint, resulting in a differential print. Subtracting the background image from the fingerprint image decreases the level of image corruption due to smudges and dirt on the sensor platen, or uneven lighting conditions. By subtracting the background image, the differential print is a clearer representation of the fingerprint which was placed on the sensor platen. Subtraction here means either taking the difference of the acquired print minus the background image, or any function of the image and background that decreases the effect of imperfections in the optics and the imaging conditions. In one embodiment, during subtraction, if the pixel value of the background is higher than the value of the fingerprint, the result is set to a default value. Thus, for example, if the pixel value of the background is 150, and the pixel value of the fingerprint is 30, the result may be set to 0, 30, or another default value. In this way, false subtractions and negative numbers are avoided.

At block 535, a new background image is captured and digitized. As the finger is removed from the sensor, the image of the new background, the result of the last finger's smudges added to the previous background, is newly captured.

At block 540, a nonce is received from the digital system 210. A nonce is a signal or code used only for one particular occasion, and not reused. The nonce includes a date/time stamp, and possibly other data.

At block 545, a hash is created of the differential print. The hash, sent with the print, makes sure that the matched print is in fact the print which was captured by the sensor 250. Additionally, by including the nonce in the hash, the time/date of the fingerprint matched is verified. This prevents a user from resending an older print to obtain a false positive indication.

At block 550, the hash and differential print is sent to the digital system 210. The digital system 210 is used to process the fingerprint further, as described in more detail below.

Figure 6A:
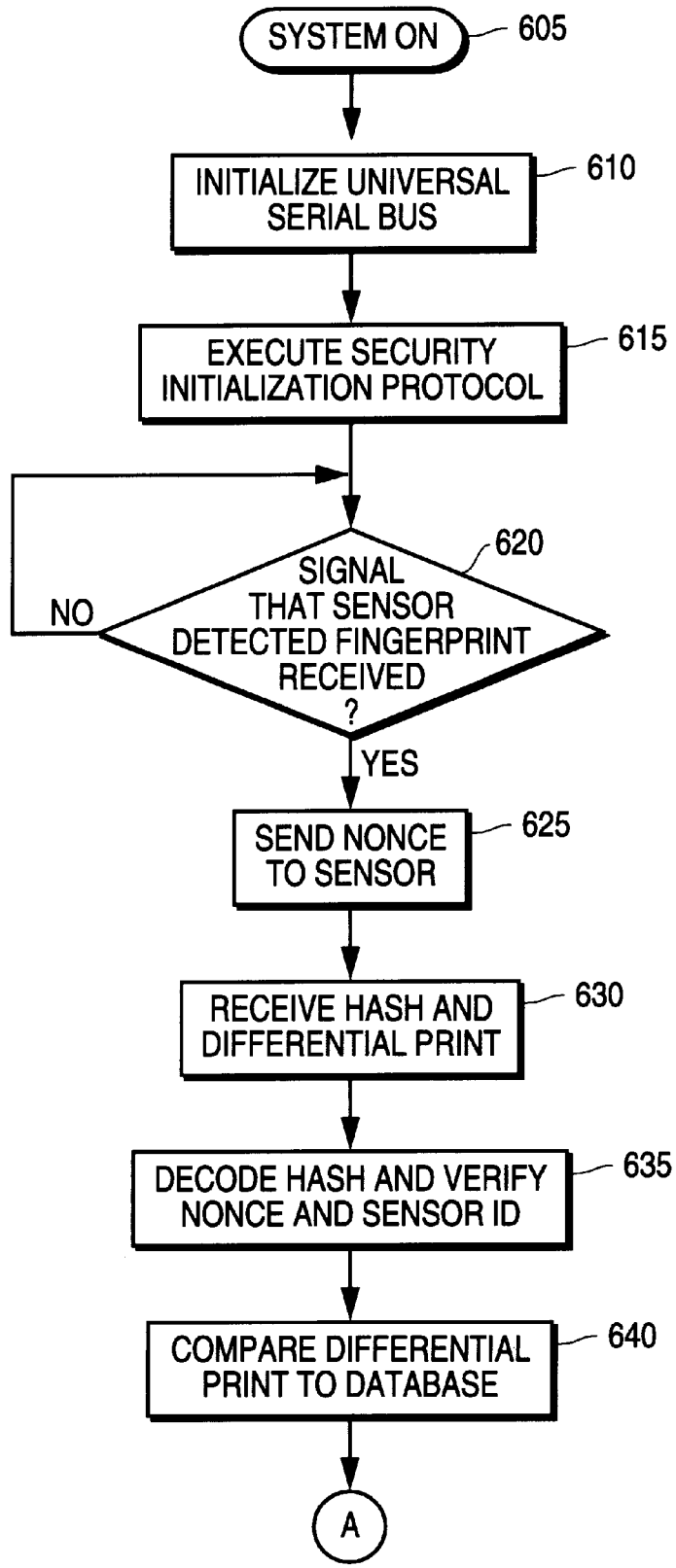
FIGS. 6A and 6B are an overview flowchart illustrating the process occurring in the digital system.
Figure 6B:
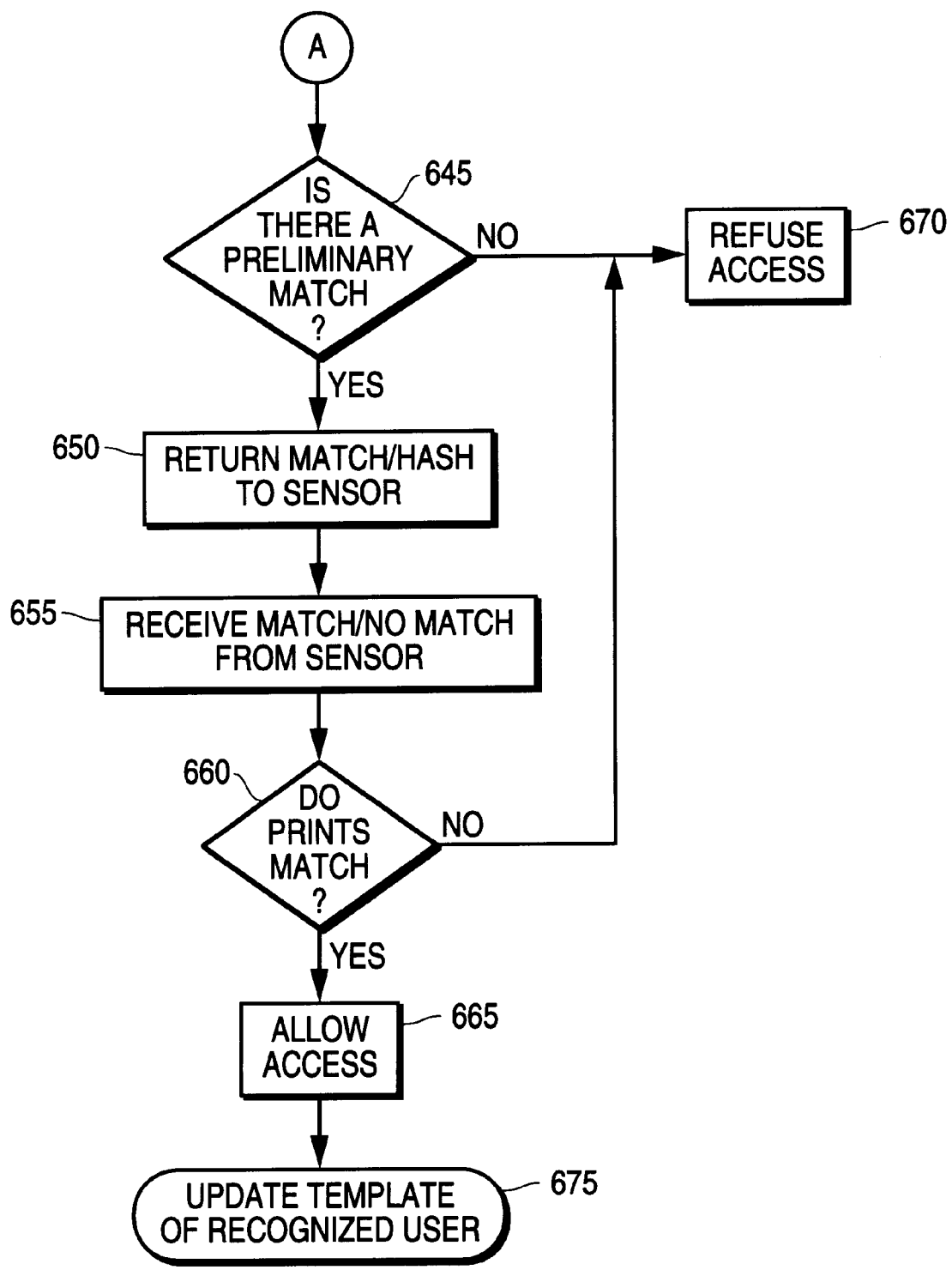

FIGS. 6A and 6B are an overview flowchart illustrating the process occurring in the digital system 210. The digital system 210 may be a computer system, a server coupled to a computer system, a self-contained PCMCIA card, a network, or similar device or devices which have the processing power to match fingerprints.

At block 605, the system is turned on and/or coupled to the sensor. In one embodiment, this occurs automatically when the computer system or other hardware on which the digital system 210 is implemented is first turned on. Alternatively, a user may initiate the present system by a keystroke, mouse selection, coupling the sensor 250 to the digital system 210 via a plug-and-play connection, or similar action.

At block 610, the universal serial bus is initialized. The universal serial bus is a communications architecture that provides a data and power connection. The universal serial bus controller 205 has to be initialized according to the USB specification. Alternatively, if the connection is not a USB connection, this step may be disregarded or another digital connection initialization step performed.

At block 615, an initialization signal and power is sent to the sensor 250. This turns on the sensor 250, as described above with respect to FIG. 5. A protocol initializes the information which is necessary for secure transactions. This process is described in more detail below.

At block 620, it is determined whether a signal has been received that a fingerprint has been detected by the sensor 250. When the sensor 250 detects a fingerprint, it sends a signal to the digital system 210. If no such signal is received, the process waits for this signal. When the signal is received, the process continues to block 625. Although this process is illustrated as a loop in FIG. 6A, in one embodiment, this may be an interrupt driven process, in which the system may perform other activities while "waiting". The arrival of a signal from the sensor 250 generates an event (interrupt) in the digital system, by which appropriate software in the digital system 210 is activated, to respond to the signal. Such interrupt handling is known in the art.

At block 625, a nonce is sent to the sensor 250. The nonce includes a time/date stamp, the current session key, and other information. It is used to verify the identity of the sensor as well as the currency of the fingerprint.

At block 630, a differential print is received from the sensor 250. This, once again, may be an interrupt. The hash is a combination of the nonce, and the differential print, as described above. At block 635, the hash is decoded, and the nonce is verified. Additionally, the session key may be verified.

At block 640, the differential print is compared to a database of templates. The database of templates includes all users who are registered with this system. The received print is compared to prints in the database. Such methods are known in the art. Processing continues at block A shown in FIG. 6B.

Referring to FIG. 6B, at block 645, the process of the present invention tests whether a preliminary match was found. If no match was found, the process continues directly to block 670. If the preliminary match was found, the process continues to block 650, and both the match and the hash are returned to the sensor for final matching. This is necessary if the digital system, in which actual analysis is done, is not secure. By returning the print and match characteristics to the sensor, the process can be made secure. Alternatively, the final match may be done in the digital system 210.

At block 655, a verifying match/no match signal is received from the sensor. Because the sensor is a closed and secure system, the final decision, regarding whether a match was found or not, is left to the sensor. In this way, possible tampering with the digital system 210 does not result in a false positive signal.

At block 660, it is determined whether the final answer is a yes or a no, i.e. whether the prints match or do not match. If the prints do not match, at block 670, access is refused.

If the prints match, at block 665 access to the program, file, or information is permitted. Furthermore, if the prints match, at block 675, the registered template for the user who was recognized is updated. Updating may be done by executing a matching process in both directions, resulting in a match number, i.e. a number which represents the percentage of features matched. Based on this number, the best print may be selected as the new template print. Alternatively, back propagation may be used to update the current template by adding information obtained in the new print. Alternatively, a Kahonen type unsupervised learning process may be used to update the current template. The Kahonen learning process is well known to those of skill in the art.

The entire matching procedure, illustrated in FIGS. 5 and 6 is very fast. In one embodiment, the matching procedure takes approximately half a second.

Security Features

Figure 7:
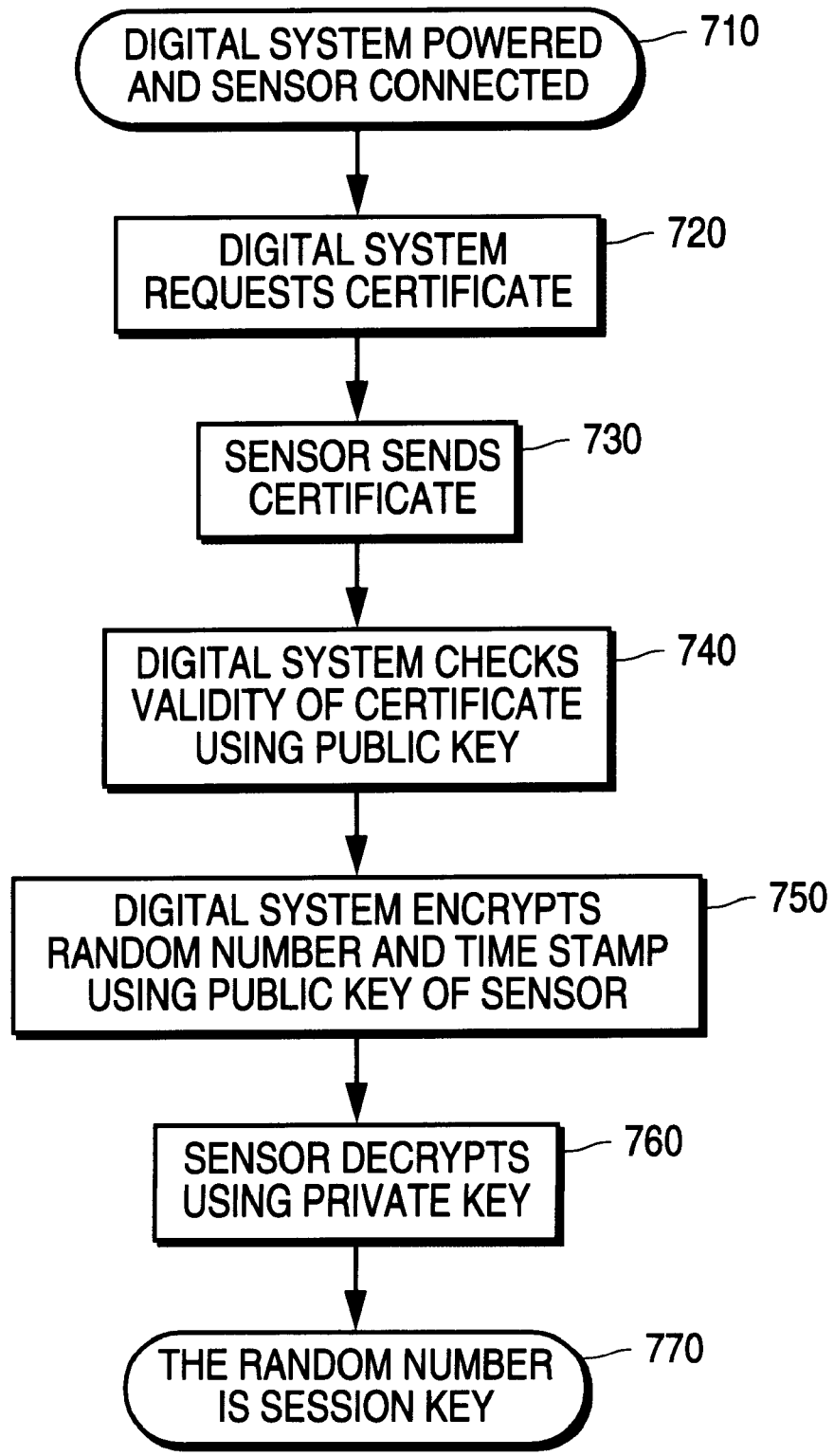
FIG. 7 is a flowchart illustrating one embodiment of the security process in the present invention.

FIG. 7 is a flowchart illustrating one embodiment of the security features which may be utilized by the present invention. As discussed above, because the digital system 210 is not necessarily secure, security procedures are important in order to prevent tampering with the system. One of the security procedures is to have the final matching in a secure system. This secure system may be the sensor, which has secure digital keys and data, or in a secure processor. In one embodiment, such processors and chips may be made secure by covering the chip with epoxy or similar hard-to-remove material. Alternatively, in the sensor, security systems may be hard-coded into the system. Furthermore, a public-key private-key system may be used to make communication between the sensor and any systems used in processing more secure. In one embodiment, a Diffie-Hellman key exchange using a session key is utilized. Other data encryption methods may be used, and are well known in the art. Encryption of all data transferred between the sensor and the digital system, provided by the present invention. Such encryption allows the present invention to be used in a broader range of non-secure environments. FIG. 7 illustrates the Diffie-Hellman key exchange.

At block 710, the digital system is powered up and the sensor is coupled to the digital system. At block 720, the digital system requests a certificate. The certificate is an identifier which is associated with a specific sensor. In one embodiment, the certificate may be stored in the sensor at the time of manufacture. Each sensor may have a unique certificate. Alternatively, multiple sensors may have the same certificate, if they are associated with the same system. For example, a large corporation may buy multiple sensors which have the same certificate, and are thus interchangeable.

At block 720, the sensor responds with the certificate. Note that at this point the sensor and digital system are interconnected, but their connection is not yet verified to be secure.

At block 730, the digital system tests the validity of the certificate using a public key. The sensor has a private key which is part of the certificate. The public key is used to decode the document encoded with a private key. If the certificate can not be decoded using the known public key, this means that the sensor is not the appropriate sensor, since the certificate was not encoded with the proper private key.

At block 740, the digital system encrypts a random number and a time stamp using the public key and sends it to the sensor. This means that only the sensor can decrypt the number. The random number, in one embodiment, is 56 digits long.

At block 750, the sensor decrypts the random number and time stamp with the private key. The time stamp is the nonce discussed above.

At block 760, the random number, decrypted by the sensor, is the session key used in this session for security. Thus, each time a session is established, security is reestablished. Additionally, even if a thief accesses the system once, when the session is finished, the thief can not utilize the data obtained originally to access a second session.

Sensor and Digital System

Figure 8:
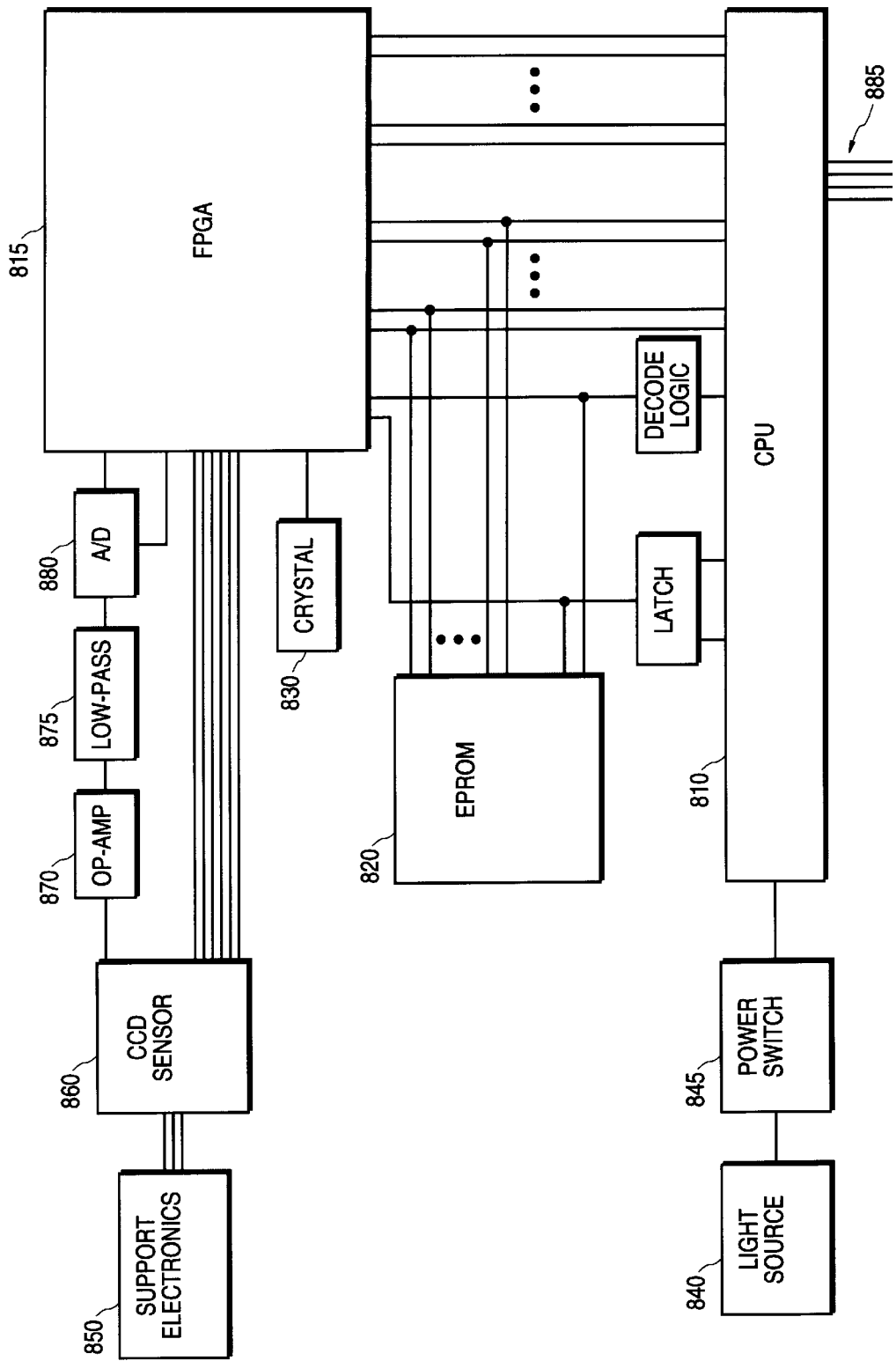
FIG. 8 are a diagram of one embodiment of the sensor of the present invention.

FIG. 8 is a diagram of one embodiment of the sensor of the present invention. A central processing unit (CPU) 810 is utilized to interface with the universal serial bus (USB) connection 885. The CPU 810 is also used to control the power switch 845, and through the power switch, the light source 840. In one embodiment, the light source 840 is a light emitting diode (LED). The CPU 810 also controls power to all other components.

The CPU 810 is coupled to a field programmable gate array (FPGA) 815. The FPGA 815 implements most of the functionality of the sensor 250 of one embodiment, and may include a random access memory (RAM). The FPGA 815 and CPU 810 together act as the subtractor, filter, USB interface, digitizer and security system. A crystal 830 may be coupled to the FPGA 815 to provide a clock signal for the FPGA 815.

An erasable programmable read only memory (EPROM) 820 is coupled between the FPGA 815 and CPU 810. The EPROM 820 contains the information necessary for initiating the sensor 250. The EPROM 820 may further contain a private key which is associated with that particular sensor 250, which permanently tags the sensor's identity.

A charge-coupled device (CCD) sensor 860 is further coupled to the FPGA 815. The CCD sensor 860 is a light-sensitive electronic device, which may detect either color or black-and-white. In one embodiment, the CCD sensor 860 is a gray-scale detecting sensor. Each CCD sensor 860 consists of an array of light-sensitive photocells. In one embodiment, the photocell is sensitized by giving it an electrical charge prior to exposure. Support electronics 850 is coupled to the CCD sensor 860, to provide the electronics to activate the CCD sensor 860. The output of the CCD sensor 860 is passed through an operation amplifier 870, and a low pass filter 875, to clean up the signal. Then, the cleaned up output of the CCD sensor 860 is passed through an analog to digital converter 880, to digitize the fingerprint. This digitized fingerprint image is passed on to the FPGA 815.

Figure 9:
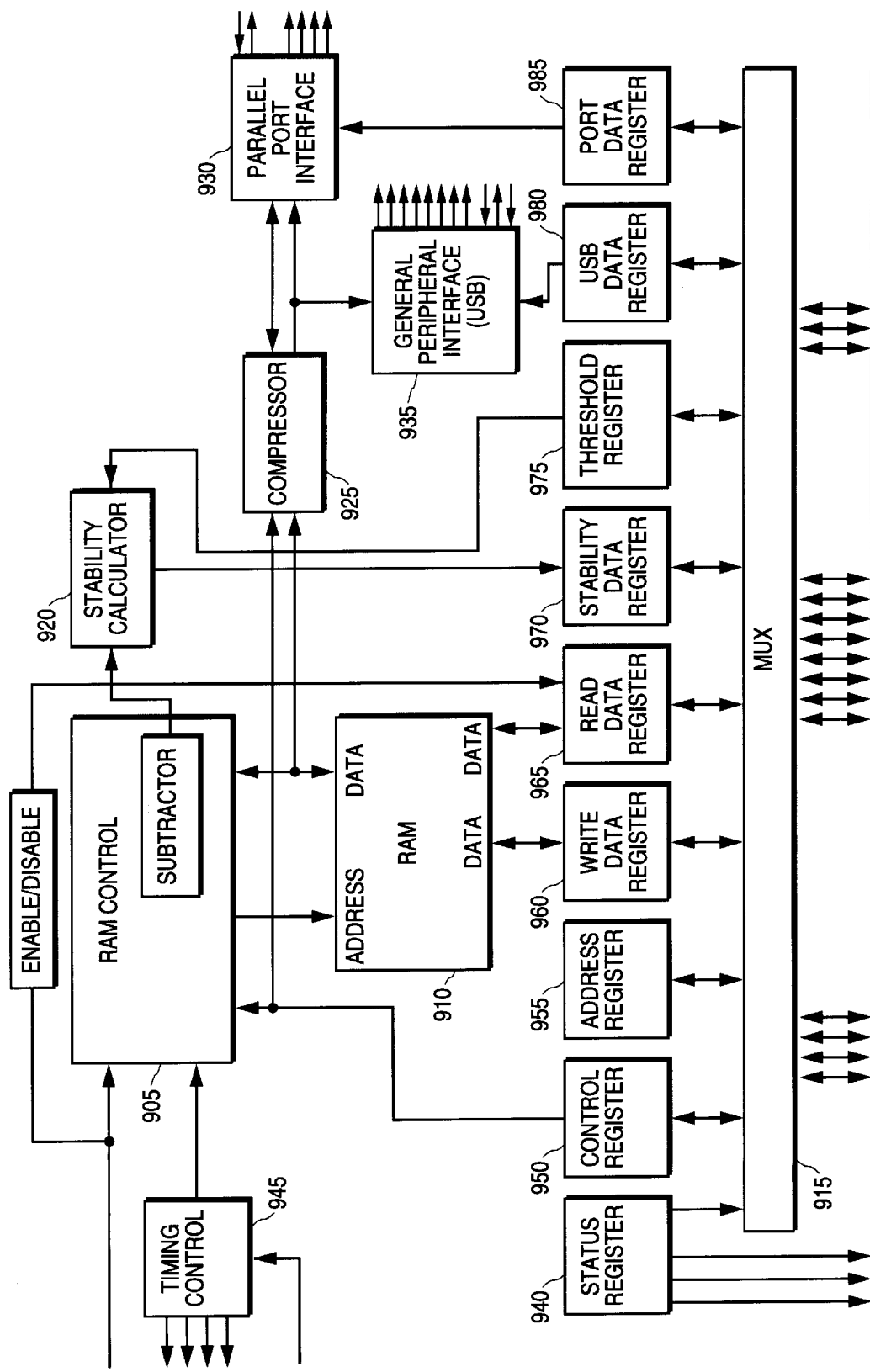
FIG. 9 is a diagram of the FPGA of FIG. 8.

FIG. 9 illustrates one embodiment of the configuration of FPGA 815 of FIG. 8. Random access memory (RAM) controller 905 controls access to RAM 910. RAM 910 is utilized to store fingerprint images, in optical form as well as digital form. RAM controller 905 further passes information to stability calculator 920. Stability calculator 920 is utilized to calculate when a received fingerprint is stable, as described below.

RAM controller 905 receives data from analog-to-digital converter 880. RAM controller 905 is clocked by a clock received through a timing control 945. FPGA 815 further includes a multiplexer (MUX) 915. MUX 915 is used to access address and data lines in the CPU 810, as shown in FIG. 8.

RAM controller 905 includes a subtractor 990, which is used to subtract a background image from a fingerprint, to determine a differential print. The output of the subtractor is coupled to the stability calculator 920. The output of the stability calculator 920 is coupled to a stability data register 970, which is a status register, indicating when the fingerprint image is stable.

Compressor 925 compresses the fingerprint image prior to transmitting it through the parallel port interface 930. Alternatively, the compressed image may be transmitted via the USB interface 935. In one embodiment, compressor 925 utilizes Huffman compression, which is a conventional data compression technique which varies the length of the encoded symbol in proportion to its information content, i.e. the more often a symbol or token is used, the shorter the binary string used to represent it in the compressed stream.

General peripheral interface, or universal serial bus interface 935 is utilized to pass data to the universal serial bus. In one embodiment, the USB access is accomplished through the CPU 810. However, the USB interface 935 may be located in the FPGA 815.

A status register 940 is coupled to the MUX 915 and the CPU interface. The status register 940 indicates the general status of the communications devices, including the parallel port, USB port, and frames. Status register 940 is controlled by the CPU 810, and passes its information to the RAM controller 905.

A control register 950 is also coupled to the MUX 915. Control register is set by the CPU 810 to control the functions of the FPGA 815. Address register 955 contains the address of the RAM data in RAM 910, allowing CPU 810 access to the RAM data. In one embodiment, address register 955 is automatically incremented when data has been written to an address. Address register is controlled by control register 950. Read data register 965 and write data register 960 buffer data read from or written to RAM 910.

Threshold register 975 includes the threshold numbers needed for stability calculations by stability calculator 920. These threshold numbers are described in more detail below. In one embodiment, threshold register 975 may be written to by the CPU 810. Port data register 985 is a register for data sent from the CPU 810 to be sent over the parallel port interface. The USB data register 980 is a register of data from the USB interface. In one embodiment, the USB data register is a read only register, which stores system information.

Figure 10:
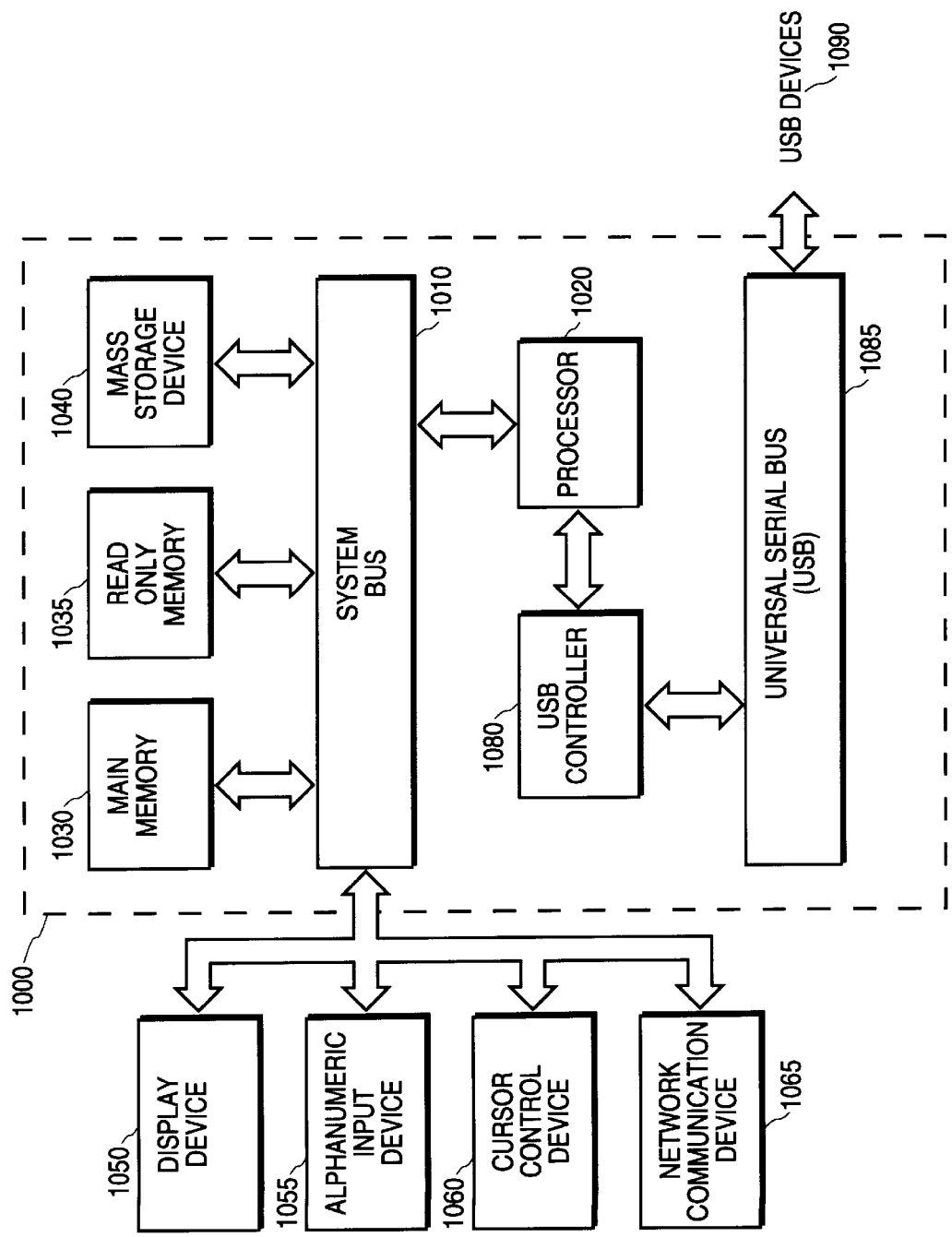
FIG. 10 is a diagram of one embodiment of the digital system of the present invention.

FIG. 10 is a diagram of one embodiment of the digital system of the present invention. Digital system 1000 comprises a system bus 1010 or other communication means for communicating information, and a processor 1020 coupled with system bus 1010 for processing information. Digital system 1000 also comprises a read only memory (ROM) and/or other static storage device 1035 coupled to system bus 1010 for storing static information and instructions for processor 1020. The digital system 1000 further comprises a main memory 1030, a dynamic storage device for storing information and instructions to be executed. Main memory 1030 also may be used for storing temporary variables or other intermediate information during execution of instructions. In one embodiment the main memory 1030 is dynamic random access memory (DRAM).

Digital system 1000 further comprises a universal serial bus (USB) controller 1080, a bus controller for controlling a universal serial bus (USB) 1085. The USB 1085 is for coupling USB devices 1090 to the digital system 1000. The sensor 250 may be one of the USB devices 1090 coupled to the digital system 1000 via the USB 1085.

Digital system 1000 can also be coupled via system bus 1010 to a display device 1050, such as a cathode ray tube (CRT) or liquid crystal display (LCD) screen, for displaying information to a user. An alphanumeric input device 1055 is typically coupled to system bus 1010 for communicating information and command selections to processor 1020. Another type of user input device is cursor control device 1060, such as a mouse, a trackball, trackpad, or cursor direction keys for communicating direction information and command selections to processor 1020 and for controlling cursor movement on display device 1050. Alternatively, other input devices such as a stylus or pen can be used to interact with the display. The digital system 1000 may further be coupled via the system bus 1010 to a network communication device 1065. The network communication device 1065 may be utilized to couple the digital system to other digital systems, servers, and networks.

Registration

Figure 11A:
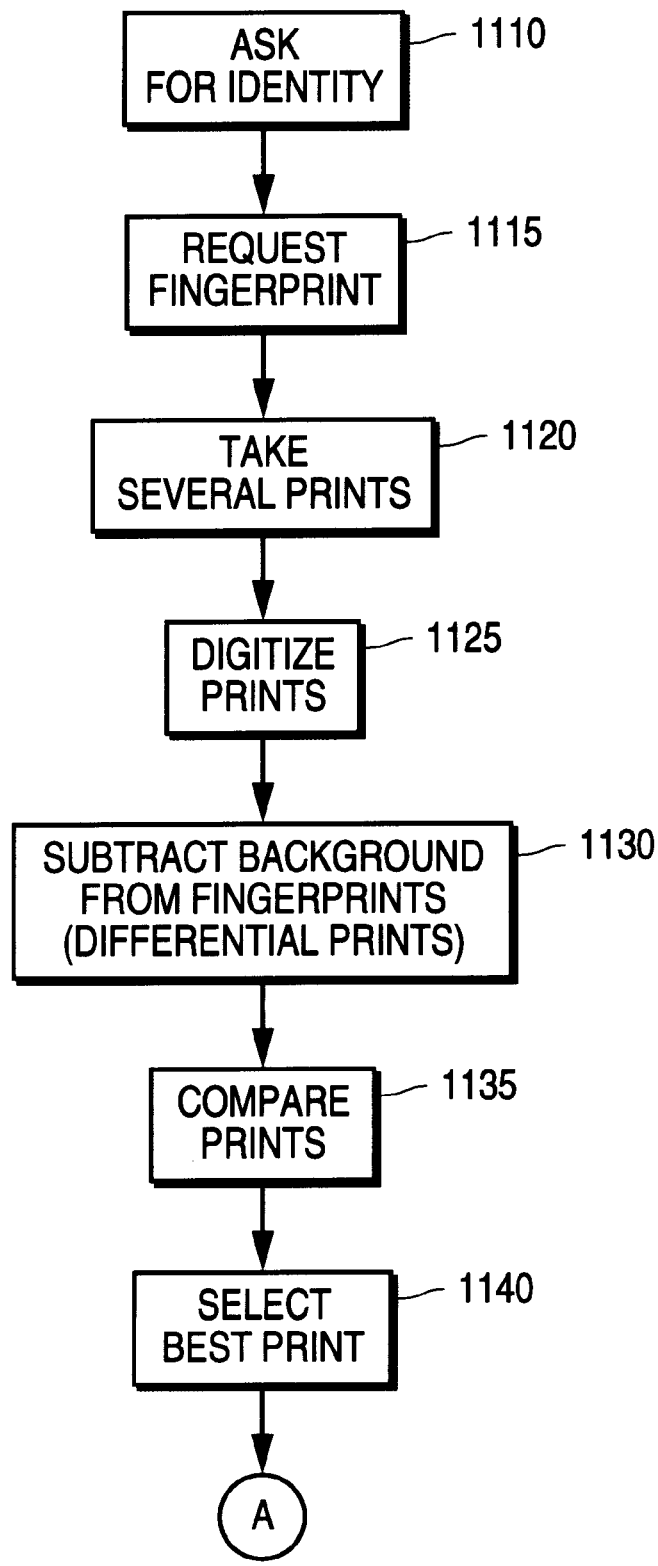
FIGS. 11A and 11B are a flowchart illustrating the process of registering a fingerprint.
Figure 11B:
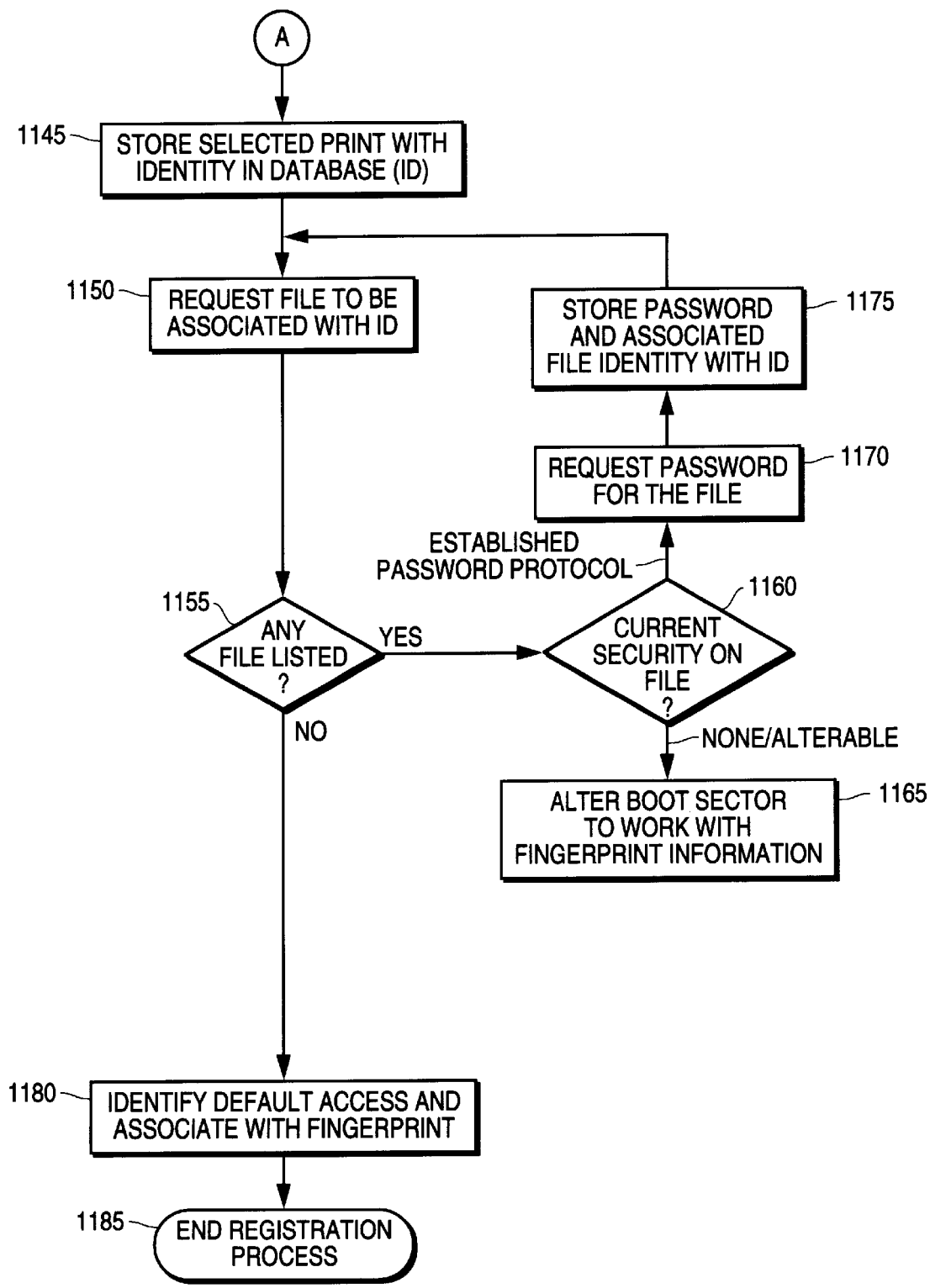

FIGS. 11A and 11B are a flowchart illustrating the process of registering a fingerprint. The registering is initiated by the user opening a registering interface. Alternatively, when the present system is first initiated, the registration process may automatically open.

At block 1110, an identity of a person trying to register is requested. The identity may be initials, or some other identifier which may later be associated with the fingerprint. In one embodiment, the full name of the user is requested here. Alternatively, for a wallet, or similar "owned" system, no identity is requested, and it is assumed that the individual who is registered with this process is the owner of the item in question.

At block 1115, a fingerprint is requested. This may be done by displaying a window, with text such as "please place your finger on the sensor now for registering", or similar text. Alternatively, the system may just wait for a fingerprint, without displaying a request.

At block 1120, a number of different prints are taken. As described above, the CCD sensor 860 detects the fingerprint, and copies the optical image to a RAM. In this instance, a plurality of prints may be taken, even if the user places his or her finger on the sensor platen once.

At block 1125, each of the fingerprints are digitized. These prints are temporarily stored in the sensor. Alternatively, they may be stored in the digital system.

At block 1130, a digitized background image is subtracted from each of the digitized prints, resulting in a differential prints. As described above, a digitized background image is obtained when the sensor is initially turned on, and every time after a fingerprint is obtained.

At block 1135, the prints are compared. This may be done using known techniques of evaluating fingerprints. For example, three or more prints may be matched, finding out how many matched points exist between prints. Such a comparison will determine which print is the best quality.

At block 1140, the best print is selected. Because the registration print is one to which later fingerprints are compared, it should be the best print possible. Therefore, the print which displays the fingerprint characteristics most clearly is selected. Alternatively, information from all the registration prints may be assembled into a single composite print which is stored in the database. Alternatively, in addition to selecting the best print, the best print is further improved, using a learning process learning from the other prints. Furthermore, as described above with respect to block 675, the template may be updated every time a new print is received from the user. This process is known in the art. Alternatively, this step may be skipped.

At block 1145, shown in FIG. 11B, the differential print is stored in the database. Alternatively, this selection process may be skipped, and all of the prints may be stored in the database as a registration dataset.

At block 1150, the system requests any files and applications which the user wishes to associate with the fingerprint and identity. The user can associate files and applications which can be opened automatically after a successful fingerprint validation process. If no such files are associated, the fingerprint merely validates the user, or permits the user access to the user's own data stored in the digital system 210 or any other system coupled to the digital system 210.

At block 1155, it is determined whether any files were identified by the user. If no files are identified, the process continues to block 1180. If files were identified, the process continues to block 1160.

At block 1160, the system determines what kind of security there is on the file selected. The user can select program files, application files, or files such as specific data files, or word processor files. Some files may be already password protected. For example, Word for Windows permits password protection of a data file. Word for Windows is a trademark of Microsoft Corporation. If the file selected either has no security or easily alterable security, the process continues to block 1165.

At block 1165, the boot sector of the file selected is altered to permit fingerprint verification or identification. Thus, when the user wishes to access that file, the user will have to show his or her fingerprint in order to access the file. Alterations of a boot sector are known in the art. The format of the boot sector is platform dependent, and thus is known and alterable for each platform. Therefore, the process accesses the boot sector of the file selected, and alters it. In one embodiment, this alteration consists of pointing the boot process to a fingerprint identification subroutine. The end of the fingerprint identification subroutine points back to the boot sector. Thus, during execution, the fingerprint verification subroutine is called up and executed.

At block 1160, if the file selected is already password protected, and such protection is not easily alterable, the process continues to block 1170. At block 1170, the password associated with that password protected file is requested. The user has to enter the password associated with the file. And, at block 1175, the password associated with that file is stored in the database, associated with the fingerprint and identity of the user. Thus, next time the user selects the file, and uses the fingerprint, the system automatically inserts the password associated with that file and individual, and opens the file.

At block 1155, if no files were listed, the process continues to block 1180. At block 1180, any default access is identified, and associated with the fingerprint. Default access may be provided, for example, to permit access to a special area in a server or system which stores the user's personal files. Thus, for example, fingerprint identification may provide automatic access to a special files list. In one embodiment, the user may define such an area. Alternatively, the user identification, entered at block 1110, may be used to determine the default area access. Alternatively, if no such area exists, the process continues directly to block 1185. At block 1185, the registration process is completed.

Capturing Fingerprint

Figure 12A:
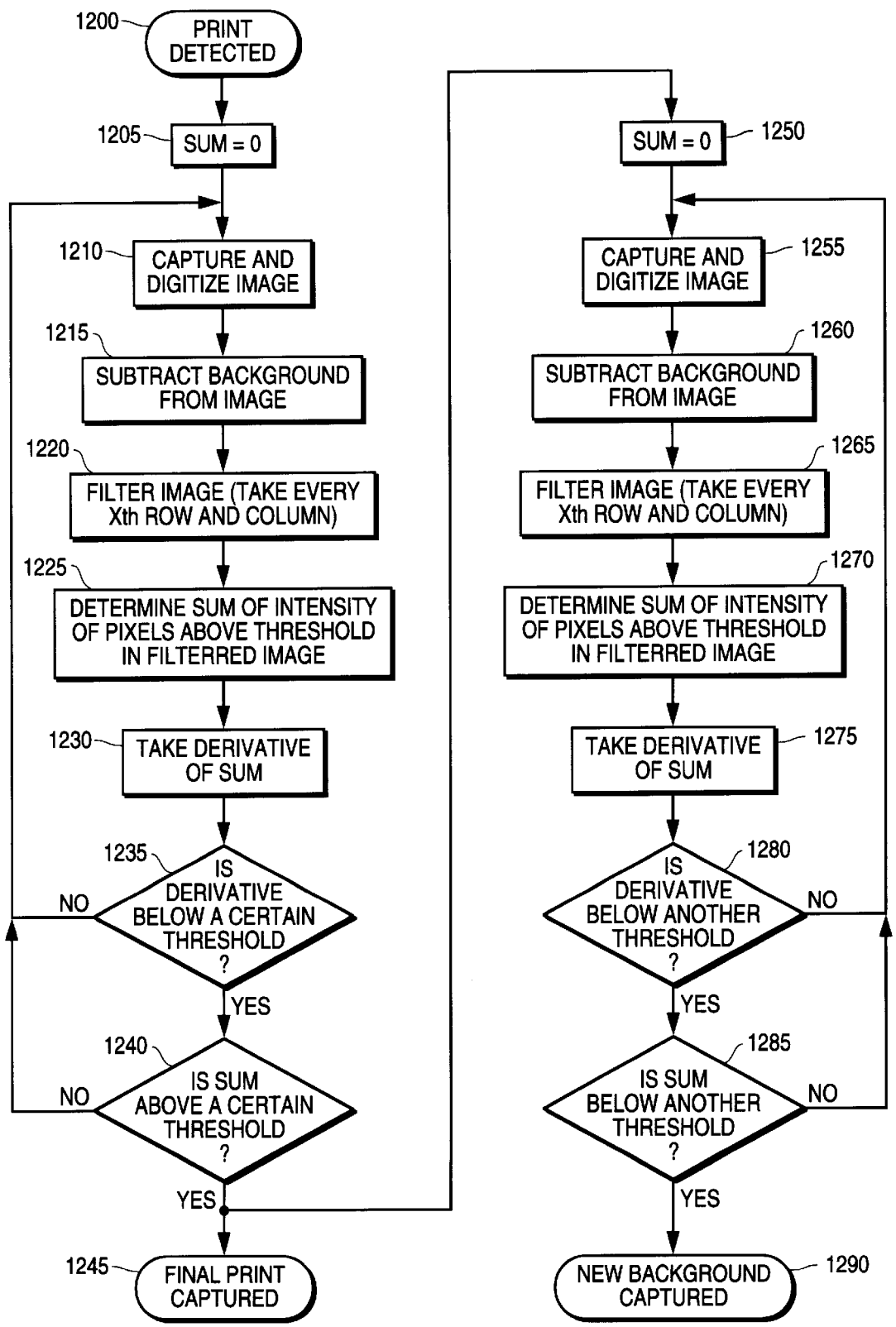
FIG. 12A is a flowchart illustrating the process of capturing a fingerprint image.

FIG. 12A is a flowchart illustrating the process of capturing a fingerprint image. This is a more detailed illustration of the functionality described with respect to blocks 535, 540, and 545 in FIG. 5, i.e. capturing fingerprint, digitizing print, and subtracting the background from the print.

At block 1200, the presence of an initial print is detected. As discussed above, this may be detected as a result of the change in the energy hitting the sensor platen of the sensor. At block 1205, a sum is set to zero. The use of this sum will become apparent below.

At block 1210, a print is captured and digitized. This process is described above in more detail. At block 1215, a digitized background image is subtracted from the digitized print. This results in a more clear representation of the actual print on the sensor platen.

At block 1220, the image is filtered, by taking every Xth row and Yth column, and taking only those pixels which are in those columns and rows. This reduces the further processing considerably, since only 1 X*Yth as many pixels need to be evaluated.

Figure 12B:
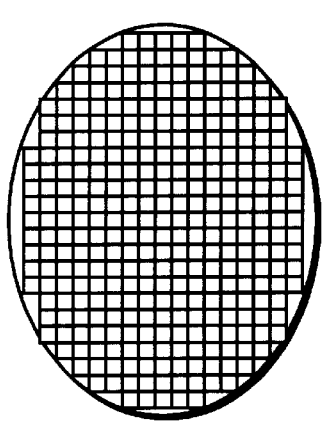
FIG. 12B is an illustration of the filtering process used in the present invention.
Figure 12B:
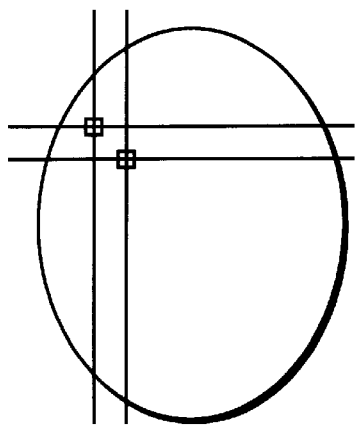
Figure 12B:
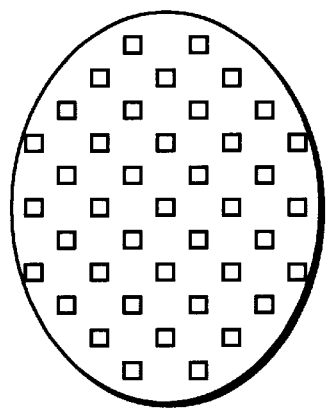

FIG. 12B illustrates this filtering process. Picture A is the image with all of the pixels, represented by small boxes. In reality, since this is a digitized image, each of those boxes corresponds to an intensity factor of that particular pixel. Picture B represents the image showing how the 0th and 3rd column and row of the pixels are selected. And Picture C represents the filtered image, with only those pixels which are in the filtered picture represented by boxes. In one embodiment, X and Y are both four. Thus, only 1 of 16 pixels are evaluated. Further processing is executed on the filtered image. This block may be skipped in some embodiments.

Returning to FIG. 12A, at block 1225, the sum of the intensity of pixels above the threshold is determined for the filtered image. In one embodiment, the digitized figure is a gray scale figure, which means that pixels may have a variety of intensities. In one embodiment, pixel intensity may vary between 0 and 6. The threshold in this instance is the average intensity of energy of a fingerprint. Thus, for example, the threshold may be 3. For three pixels which are 2, 4, and 6, the results would be 0, +1, +3, thus the sum would be four (4).

At block 1230, the derivative of this sum is taken. This determines the rate of growth of the sum, compared to the prior sum. In one embodiment, the derivative is determined by subtracting the prior sum from the current sum.

At block 1235, it is determined whether the derivative is below a certain threshold. This threshold may be determined based on the general fingerprint quality of the sensor. If the derivative is not below the threshold, in other words, the sum is still growing, the process returns to block 1210, and the next image is captured. If the derivative is below the threshold, the process continues to block 1240.

At block 1240, it is determined whether the sum is above a certain minimum threshold. This threshold is the average contrast ridge to valley for a fingerprint taken with that particular sensor. In one embodiment, this threshold may be updated in the system based on later results. If the sum is not above the threshold, the process returns to block 1210, and the next image is taken. If the sum is above the minimum threshold, the fingerprint is sufficiently large and intense, and the process continues to block 1245 and block 1250. At block 1245, the final print is captured, and passed on for further processing.

Figure 12C:
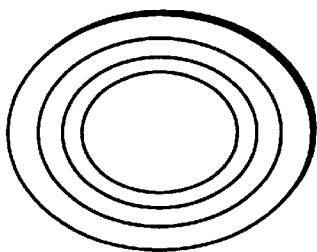
FIG. 12C is an illustration of the fingerprint snapshots taken progressively during the process of capturing the fingerprint image.
Figure 12C:
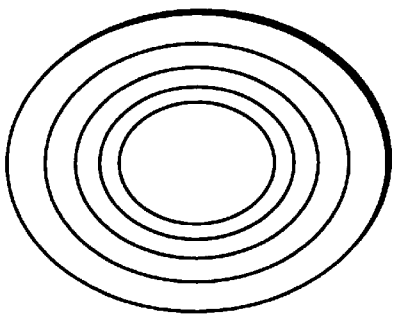
Figure 12C:
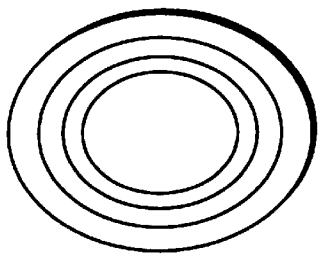
Figure 12C:
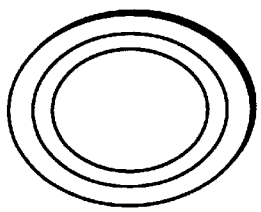
Figure 12C:
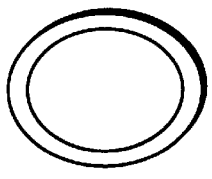
Figure 12C:
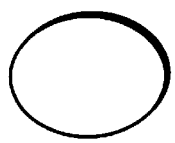

FIG. 12C represents an illustration of this process. For example, Picture D represents an image which is barely visible. Because the first image is captured when the energy level first decreases, it is only a partial picture of the finger. Pictures D, E, F, G, and H show the gradual increase of the size of the fingerprint, during successive pictures which are captured. When Picture I is captured, the system determines that the size is decreasing. The fingerprint size represented by the previous image, Picture H, is therefore captured and retained as the optimal fingerprint image.

Returning to FIG. 12A, at block 1250, the sum is reset to zero. At block 1255, the next image is captured and digitized. The background is subtracted from the image at block 1260.

At block 1265, the image is filtered, and at block 1270, the sum of the intensity of the pixels above a threshold intensity are added. A derivative of this sum is taken at block 1275. At block 1280, it is determined whether the derivative is below a threshold. This threshold is similar to the threshold discussed above with respect to FIG. 1235. When the images stop decreasing, the derivative of the images gets closer to zero, and this derivative meets the threshold. If the derivative is not below the threshold, the process returns to block 1255. If the derivative is below the threshold, the process continues to block 1285. At block 1285, it is determined whether the sum is below a certain threshold. If the sum is not below the threshold, the process returns to block 1255. If the sum is below the threshold, the process continues to block 1290. At block 1290, the new background is captured. As can be seen, blocks 1255 to 1285 are the reverse of blocks 1210 to 1240. Thus, the process is executed in reverse to obtain a new background image. This background image is used in the next process.

Auto-launch Feature

Figure 13:
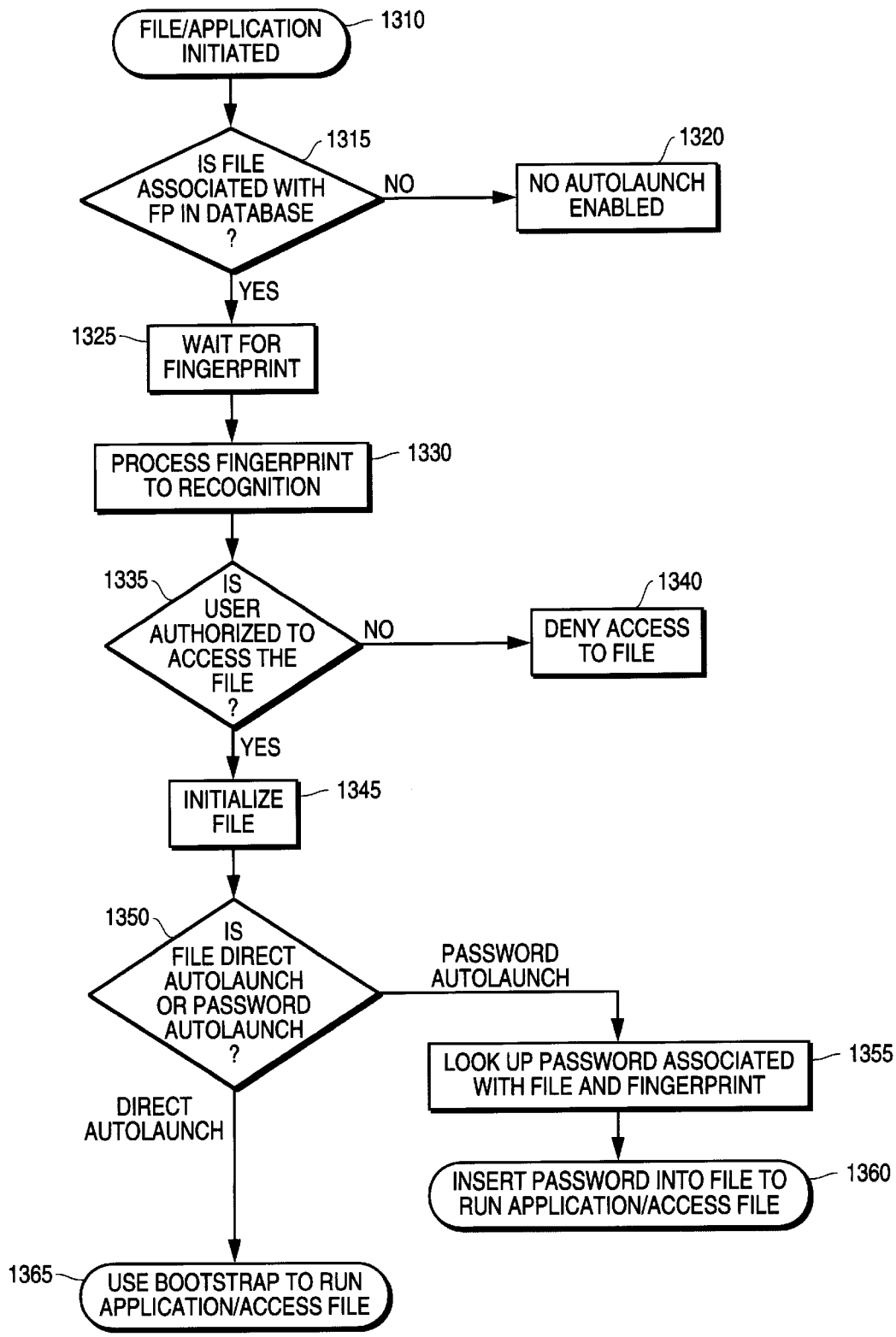
FIG. 13 is a flowchart illustrating the process of auto-launching.

FIG. 13 is a flowchart illustrating the process of auto-launching an application or document. At block 1310, the application is initiated. The application may be initiated by the user selecting the file, by the user placing his or her fingerprint on the sensor, or other means.

At block 1315, it is determined whether there is a file associated with the fingerprint in the database as described earlier. In other words, if the file which was initiated does not have an associated fingerprint verification/identification requirement, the process continues to block 1320, where the auto-launch process aborts. If the user selected a file which does have fingerprint verification/identification, the process continues to block 1325.

At block 1325, the process waits for a fingerprint. The process may display a note, requesting a fingerprint. If the user initiated the process by placing his or her finger on the sensor, the process goes directly to this block. In one embodiment, the process starts here, and blocks 1310 and 1315 are skipped. This may be applicable when a user wishes to access the user's special storage area, or a default file using fingerprint recognition.

At block 1330, the fingerprint is processed to recognition. This process is as described above.

At block 1335, the database is queried to determine if the user is authorized to access the selected file or application. The user's identification is determined at block 1330, thus, this can be automated. If the user is not authorized to access the selected file, the process continues to block 1340, and access to the file is denied. In one embodiment, the system displays the message "User not authorized to access selected file", or similar message.

If the user is authorized to access the selected file, the process continues to block 1345. At block 1345, the file/application is initialized. If this is an application program, the application program is selected. If it is a file, to be opened by an application program, the file is found, and selected.

At block 1350, it is determined what type of auto-launch is associated with the selected file/application. As discussed above with respect to the registration, FIG. 11, the file may be either boot strap auto-launched or password auto-launched.

Returning to FIG. 13, at block 1350, if the process is password auto-launch, the process continues to block 1355. At block 1360, the password associated with the file and the fingerprint is looked up in the database. As described above, in FIG. 11, for password enabled files/applications the password is stored in the database. At block 1365, the password is inserted into the file, in the proper location, and the file is opened/accessed.

At block 1350, if the process is direct auto-launch, the process continues to block 1370. At block 1370, the bootstrap is used to run the application or access to the file. As described above with respect to FIG. 11, the boot sector of the file may be altered to enable fingerprint access. Thus, when the fingerprint is received the file/application is automatically called up.

Token Interface

Figure 14:
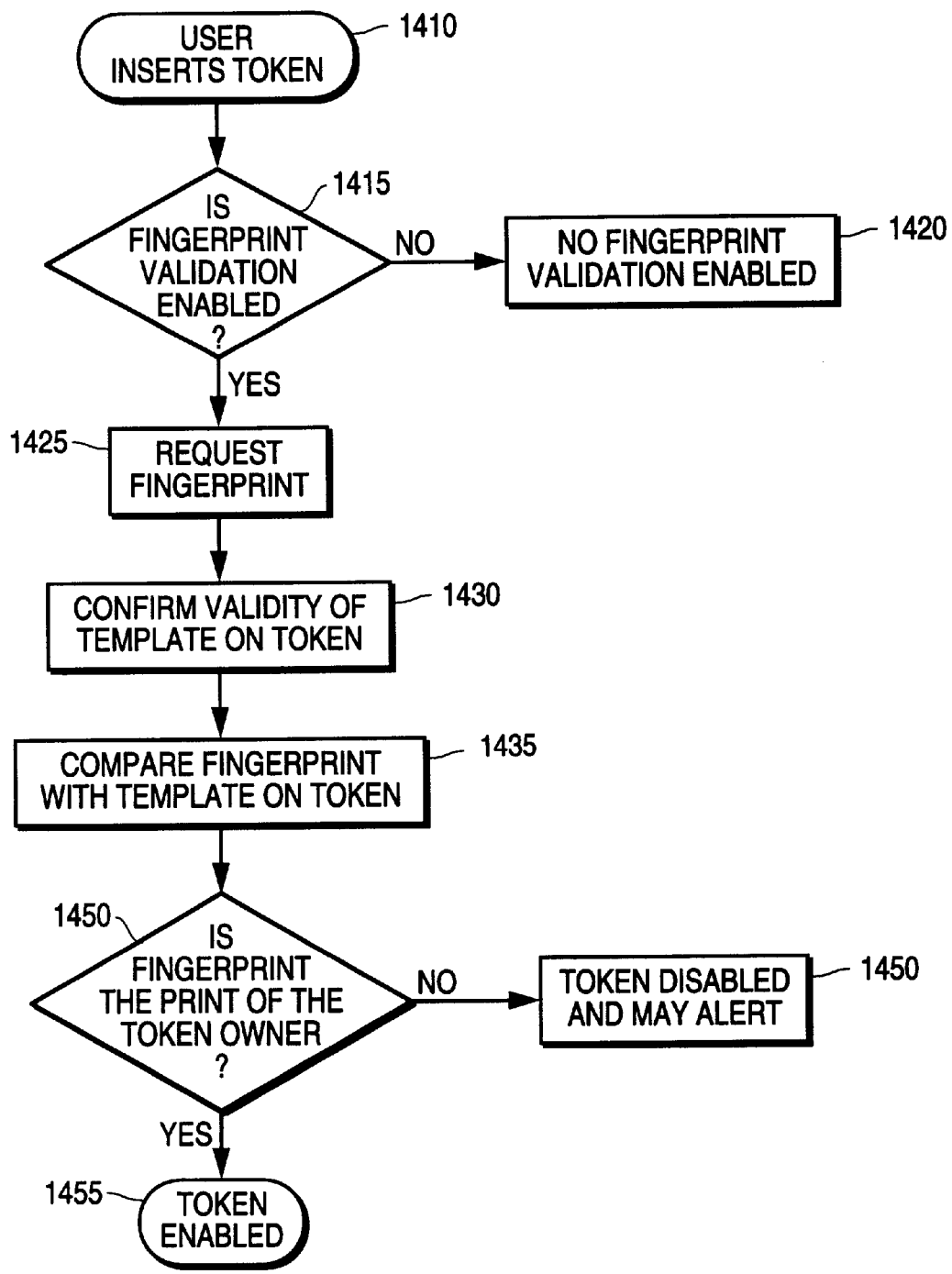
FIG. 14 is a flowchart illustrating the process of using a smart card in conjunction with the fingerprint recognition system of the present invention.

FIG. 14 is a flowchart illustrating the process of using a token in conjunction with the fingerprint recognition system of the present invention. The token may be a key, bar code, diskette, smart card or similar external data container.

At block 1410, the user inserts the token. In one embodiment, the token needs to be coupled to the digital system. In an alternative embodiment, the digital system may be incorporated within the token, and thus the token need only be coupled to the sensor.

At block 1415, the process tests whether fingerprint validation is enabled. The token may be usable without fingerprint validation. If fingerprint validation is not enabled, the process continues to block 1420. At block 1420, the process terminates, since no fingerprint validation is enabled. If fingerprint validation is enabled, the process continues to block 1425.

At block 1425, a fingerprint is requested. This may occur by the system displaying a message such as "please place your finger on the sensor", or alternatively may just be an internal wait state for fingerprint validation. Thus, here the user places his or her finger on the sensor At block 1430, the validity of the template on the token is confirmed. The token contains a template of the authorized user's fingerprint. The process tests whether the template has been tampered with. In one embodiment, a public-key private-key signature exchange is used to verify that the template is secure.

At block 1435, the fingerprint is compared with a templates on the token. The token is "owned" by one or more users. At this stage, the process tests whether a user who an owner of the token is using it.

At block 1445, The process test whether the fingerprint is a print of an owner of the token. The token's owner's prints are registered within the token. If the fingerprint is not the print of the token owner, the process continues to block 1450, and the token is disabled. Furthermore, an alert may be sent out indicating that the token is being used by an unauthorized user.

If the fingerprint is the print of the token owner, the process continues to block 1455. At block 1455, the token is enabled, and the user can access data stored on the token. For example, if a user owns a smart card which is a credit card, this process may be used to verify that the smart card is not stolen, and actually belongs to the user in question. A thief could not activate the smart card, and thus get access to the confidential information stored on the card.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense. The present invention should not be construed as limited by such embodiments and examples, but rather construed according to the following claims.

What is claimed is:

1. A method of recognizing a fingerprint comprising:
   detecting the fingerprint;
   digitizing the fingerprint;
   subtracting a digitized background from the fingerprint, resulting in a difference print;
   receiving a nonce from a digital system;
   generating a hash including the differential print and the nonce;
   sending the hash and the differential print to the digital system; and
   processing the difference print.

2. The method of claim 1 further comprising:
   detecting a background; and
   digitizing the background, resulting in the digitized background.

3. The method of claim 1 further comprising:
   initializing a fingerprint recognition system when the fingerprint recognition system is initially turned on;
   detecting a first background when the fingerprint recognition system is being initialized;
   digitizing the first background; and
   detecting a new background after the fingerprint is detected; and
   digitizing the new background.

4. A fingerprint detection system comprising:
   a computer system including a processor, the computer system generating a nonce for security;
   a universal serial bus coupled to the processor;
   a fingerprint sensor coupled to the universal serial bus, the fingerprint sensor for detecting a fingerprint, generating a hash including the fingerprint and the nonce, and securely transmitting the fingerprint and the nonce to the processor for analysis.

5. The fingerprint detection system of claim 4, further comprising:
   a token including fingerprint data and other data, wherein the token is enabled or disabled based on whether a match is established between the fingerprint detected by the fingerprint sensor and fingerprint data stored on the token.

6. The fingerprint detection system of claim 4, wherein the fingerprint sensor further comprises:
   a sensing unit for obtaining a fingerprint image and a background image;
   a digitizer for digitizing the fingerprint image and the background image; and
   a subtractor for subtracting a background image from the fingerprint image thereby generating a differential image.

7. The fingerprint detection system of claim 6, wherein the fingerprint sensor further comprises a security unit for establishing secure communication with the computer system.

8. The fingerprint detection system of claim 7, wherein the secure communication comprises one or more of the following: encrypted communication, communication including a digital signature, or coded communication.

9. The fingerprint detection system of claim 6, wherein the computer system further comprises:
   a database including fingerprint data; and
   a comparator for comparing the differential image received from the fingerprint sensor with the fingerprint data in the database.

10. The fingerprint detection system of claim 9, further comprising a learning unit for adding fingerprints to the database and for updating the fingerprint data in the database with information from the fingerprint image if a match is found.

11. The fingerprint detection system of claim 4, wherein the computer system compares the differential image to the fingerprint data, and the fingerprint sensor performs the match.

12. The fingerprint detection system of claim 4, wherein the computer system auto-launches an application in response to a validation of the fingerprint.

13. The fingerprint detection system of claim 4, wherein the sensor automatically captures the fingerprint image based on a quality of the fingerprint on the sensor.

14. The fingerprint detection system of claim 13, wherein the fingerprint sensor captures a plurality of prints and compares the plurality of prints to determine a time to automatically capture the fingerprint image.

15. A sensor comprising:
   a sensing unit for obtaining a background image and a fingerprint image;
   a digitizer for digitizing the images;
   a subtractor for subtracting the background image from the fingerprint image, thereby generating a differential image;
   a security unit for receiving a nonce from the digital system and generating a hash including the differential print and the nonce; and
   a connection to a digital system for sending the hash and the differential print a device.

16. The sensor of claim 15, wherein the
   security unit is further for establishing secure communication between a sensor and a device to which the sensor is coupled.

17. The sensor of claim 16, wherein the security unit includes an auto-launcher to auto-launch an application in response to validating the fingerprint image.

18. The sensor of claim 15, further comprising a decision making unit for matching the fingerprint image and determining whether the fingerprint image matches another print.

19. The sensor of claim 15, wherein the connection is a universal serial bus connection for connecting the sensor to the device.

20. The fingerprint detection system of claim 15, wherein the sensor automatically captures the fingerprint image based on a quality of the fingerprint on the sensor.

21. The fingerprint detection system of claim 20, wherein the fingerprint sensor captures a plurality of prints and compares the plurality of prints to determine a time to automatically capture the fingerprint image.

22. A method comprising the steps of, in a sensor:

capturing and digitizing a background print;

capturing and digitizing a current fingerprint;

subtracting the background print from the current fingerprint, thereby generating a differential print;

receiving a nonce from the digital system;

generating a hash including the differential print and the nonce; and sending the hash and the differential print to a digital system for matching.

23. The method of claim 22, wherein the step of capturing the current fingerprint image comprises the steps of:

detecting time to capture the fingerprint based on a quality of the fingerprint on the sensor; and capturing the fingerprint when the fingerprint quality is optimal.

24. The method of claim 22, wherein the step of capturing the current fingerprint image comprises the steps of:

detecting a first fingerprint image;

detecting a second fingerprint image a short time after detecting the first fingerprint image;

comparing an area of the first fingerprint image with an area of the second fingerprint image; and if the area of the second fingerprint image is smaller than the area of the first fingerprint image, capturing the first fingerprint image as the current fingerprint image.

25. The method of claim 22, further comprising the step of executing a security handshake with the digital system for establishing a security protocol.

26. The method of claim 25, wherein the step of executing the security handshake comprises the steps of:

receiving a digital certificate from the sensor indicating the sensor's identity;

validating the digital certificate using a public key of the sensor;

encrypting a random number with the public key of the sensor and sending the random number to the sensor as a session key.

27. The method of claim 22, wherein the hash includes the nonce, the differential print, and a sensor signature.

28. The method of claim 22, further comprising the steps of, in the digital system:

decoding the secure representation of the differential print;

establishing a preliminary match between the differential print and a fingerprint in a database;

sending the preliminary match to the sensor; and receiving a final decision from the sensor.

29. The method of claim 28, further comprising the steps of:

updating the template of the fingerprint in the database if the final decision was a match.

30. The method of claim 28, further comprising the steps of, in the digital system:

storing the fingerprint in the database as identity information if the final decision was a match; and associating access to a file or program with the identity information, such that the file or program may be auto-launched using the fingerprint.

31. The method of claim 30, wherein the step of associating access comprises altering a boot sector of the file or program to require the fingerprint in order to load.

32. The method of claim 30, wherein the step of associating access comprises requesting a password for the file or program;

associating the password with the fingerprint; and when the file or program is launched, releasing the password on fingerprint validation.

33. The method of claim 22, wherein the sensor is coupled to a digital system using a Universal Serial Bus.

* * * * *